(12) United States Patent
Langlois

(10) Patent No.: US 11,878,779 B2
(45) Date of Patent: Jan. 23, 2024

(54) ENHANCED TRIM TAB SYSTEM WITH FLUID HINGE FOR VARIABLE-TRANSOM WATERCRAFTS

(71) Applicant: Joseph R. Langlois, Pompano Beach, FL (US)

(72) Inventor: Joseph R. Langlois, Pompano Beach, FL (US)

( * ) Notice: Subject to any disclaimer, the term of this patent is extended or adjusted under 35 U.S.C. 154(b) by 383 days.

(21) Appl. No.: 17/401,156

(22) Filed: Aug. 12, 2021

(65) Prior Publication Data

US 2021/0371059 A1 Dec. 2, 2021

Related U.S. Application Data

(63) Continuation-in-part of application No. 17/306,595, filed on May 3, 2021, now Pat. No. 11,459,063, and a continuation-in-part of application No. 16/432,393, filed on Jun. 5, 2019, now Pat. No. 10,994,807, and a continuation-in-part of application No. 16/375,453, filed on Apr. 4, 2019, now Pat. No. 10,513,312, and a continuation-in-part of application No. 16/032,653, filed on Jul. 11, 2018, now Pat. No. 10,358,195, and a continuation-in-part of application No. 15/617,365, filed on Jun. 8, 2017, now Pat. No. 10,315,737, and a continuation-in-part of application No. 14/997,244, filed on Jan. 15, 2016, now abandoned.

(51) Int. Cl.
*B63B 39/06* (2006.01)
*B63B 34/75* (2020.01)

(52) U.S. Cl.
CPC ............ *B63B 39/061* (2013.01); *B63B 34/75* (2020.02)

(58) Field of Classification Search
CPC .............................. B63B 39/061; B63B 34/75
See application file for complete search history.

(56) References Cited

U.S. PATENT DOCUMENTS

| | | | | |
|---|---|---|---|---|
| 5,350,327 | A * | 9/1994 | Self | B63H 20/10 114/274 |
| 10,358,195 | B1 * | 7/2019 | Langlois | B63B 39/061 |
| 2009/0165694 | A1 * | 7/2009 | Beamer | B63H 20/02 114/285 |
| 2021/0316818 | A1 * | 10/2021 | Langlois | B63B 1/242 |
| 2021/0371059 | A1 * | 12/2021 | Langlois | B63B 39/061 |

* cited by examiner

*Primary Examiner* — S. Joseph Morano
*Assistant Examiner* — Jovon E Hayes
(74) *Attorney, Agent, or Firm* — Melvin K. Silverman

(57) ABSTRACT

A system for a transom-mount trim tab with a fluid hinge, including a trim tab having a planar surface, a forward section located under a hull of a watercraft, a rear portion extending aft of a transom, a pair of guiding tabs coupled to the trim tab, and a forward mounting means including fluid hinge brackets, each with a mounting plate, and a containment protrusion. The system further includes a pair of aft mounting brackets configurable for variable mounting, wherein each mounting bracket includes a vertical leg having an upper portion configurable to be angulated relative to a transom of a watercraft and a bottom portion configured in a vertical orientation. The upper portion of the vertical leg and the mounting bracket have a configurable angle there-between.

15 Claims, 26 Drawing Sheets

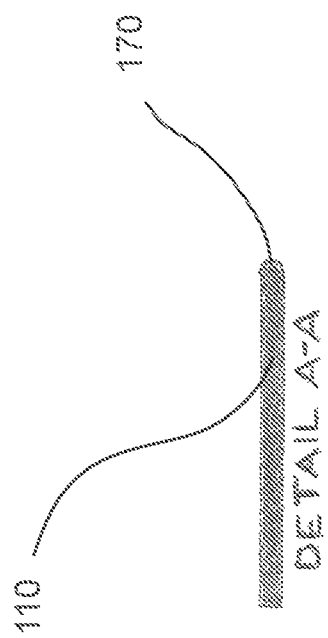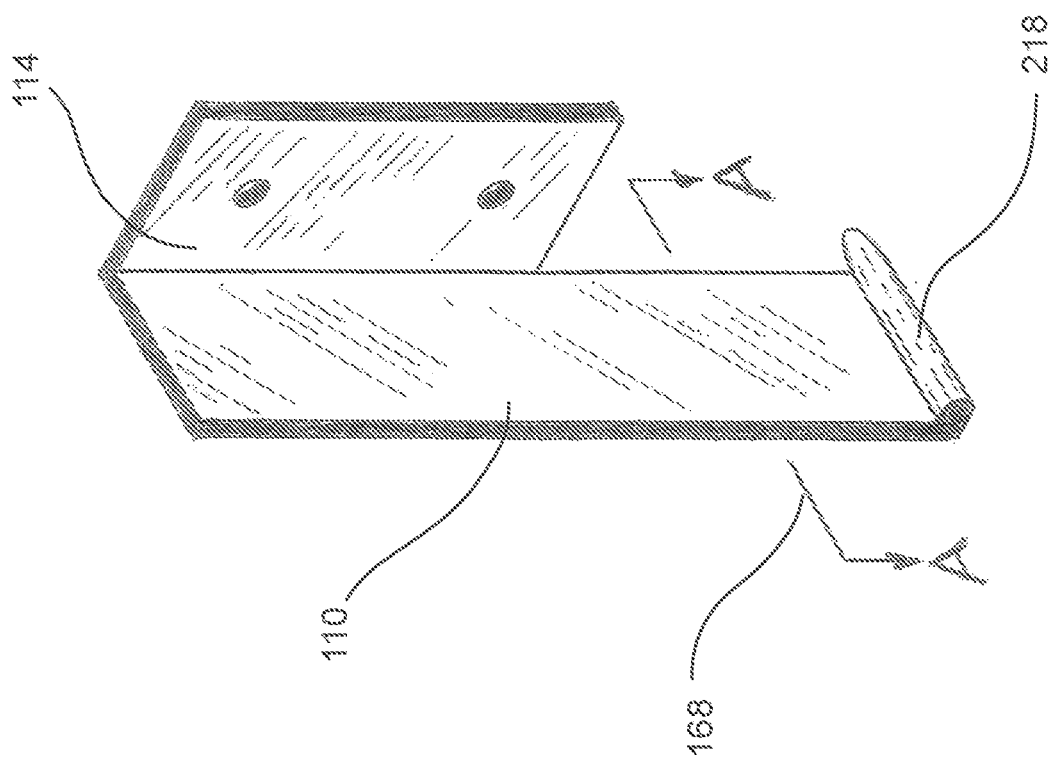

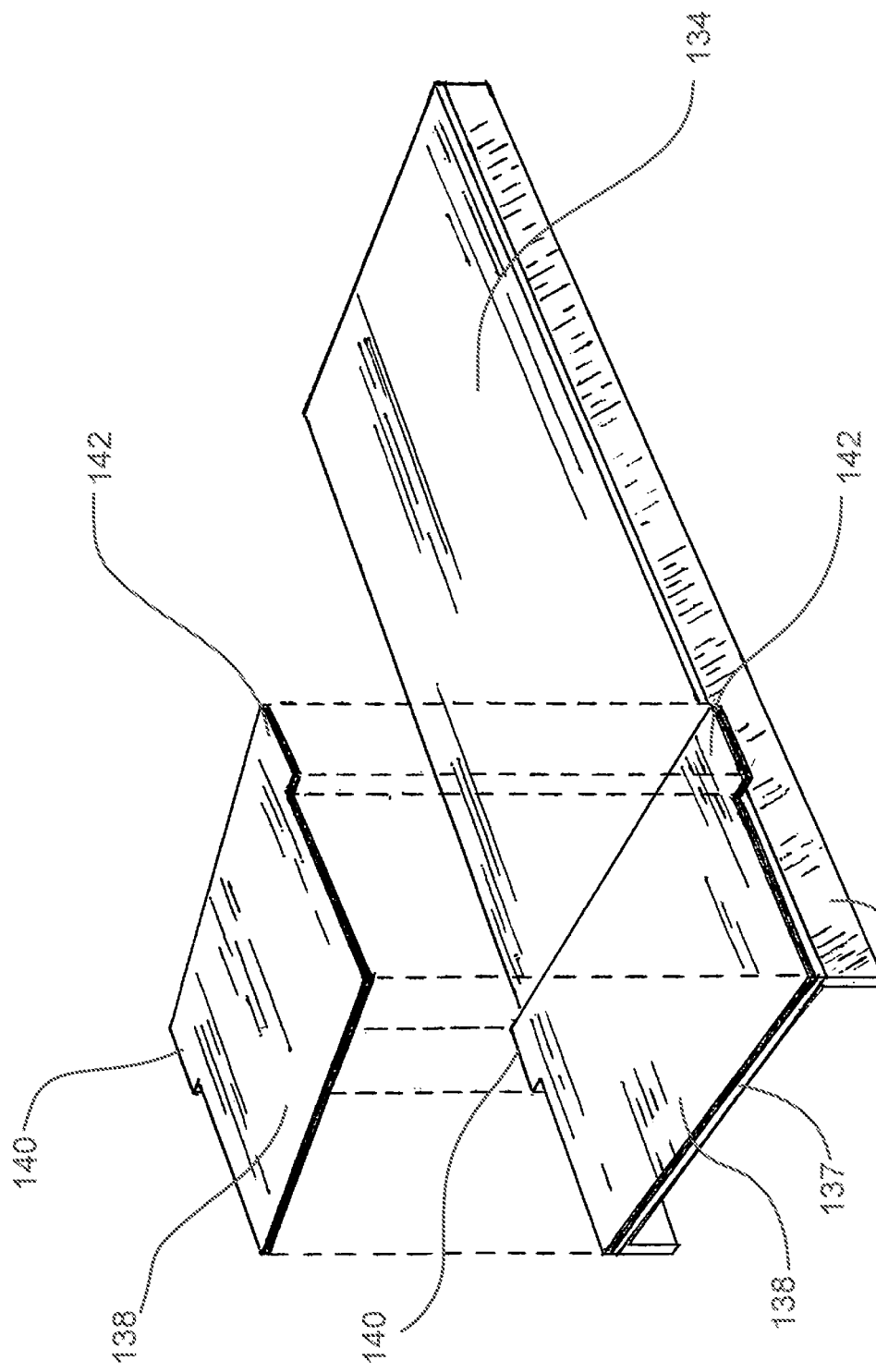

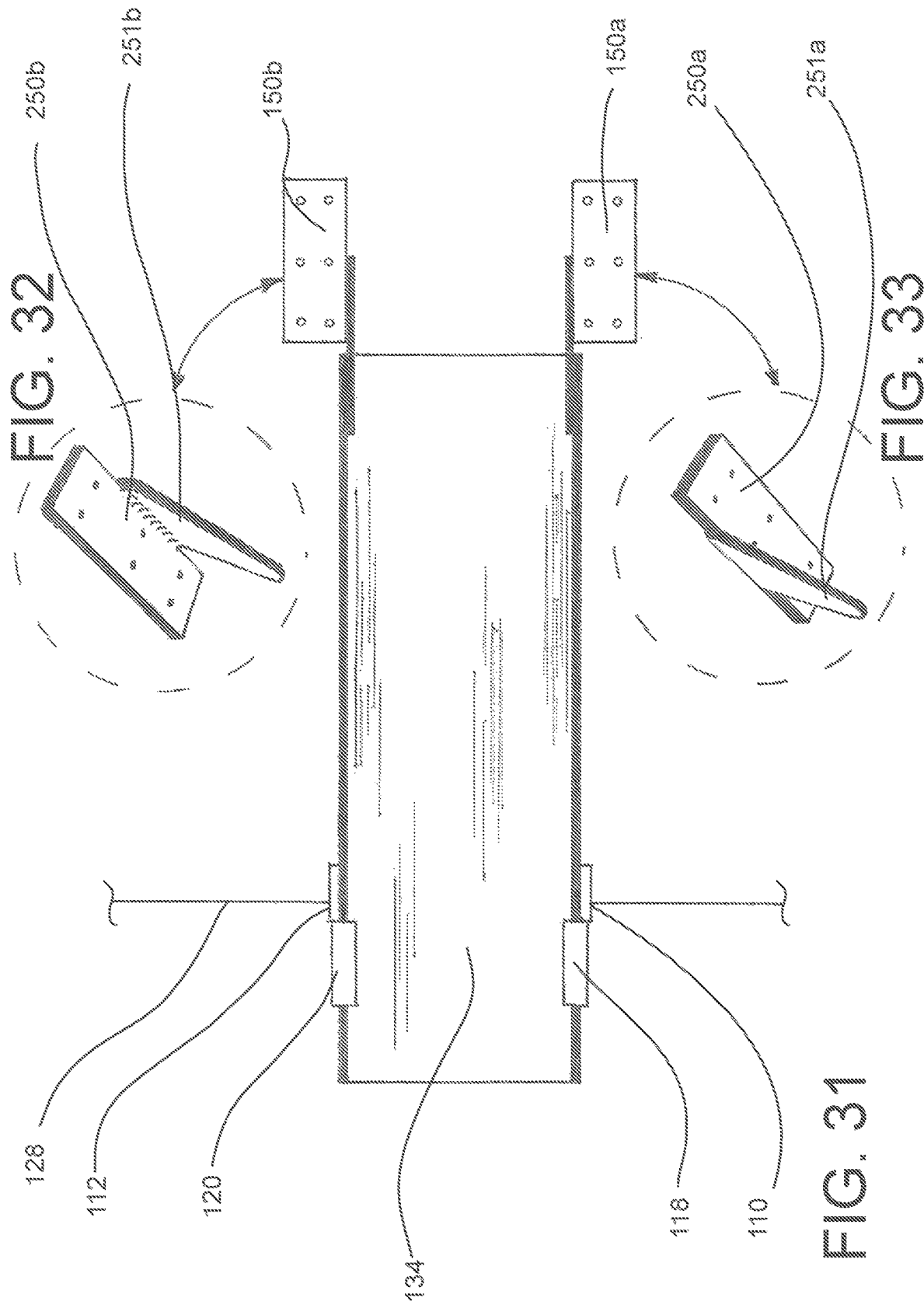

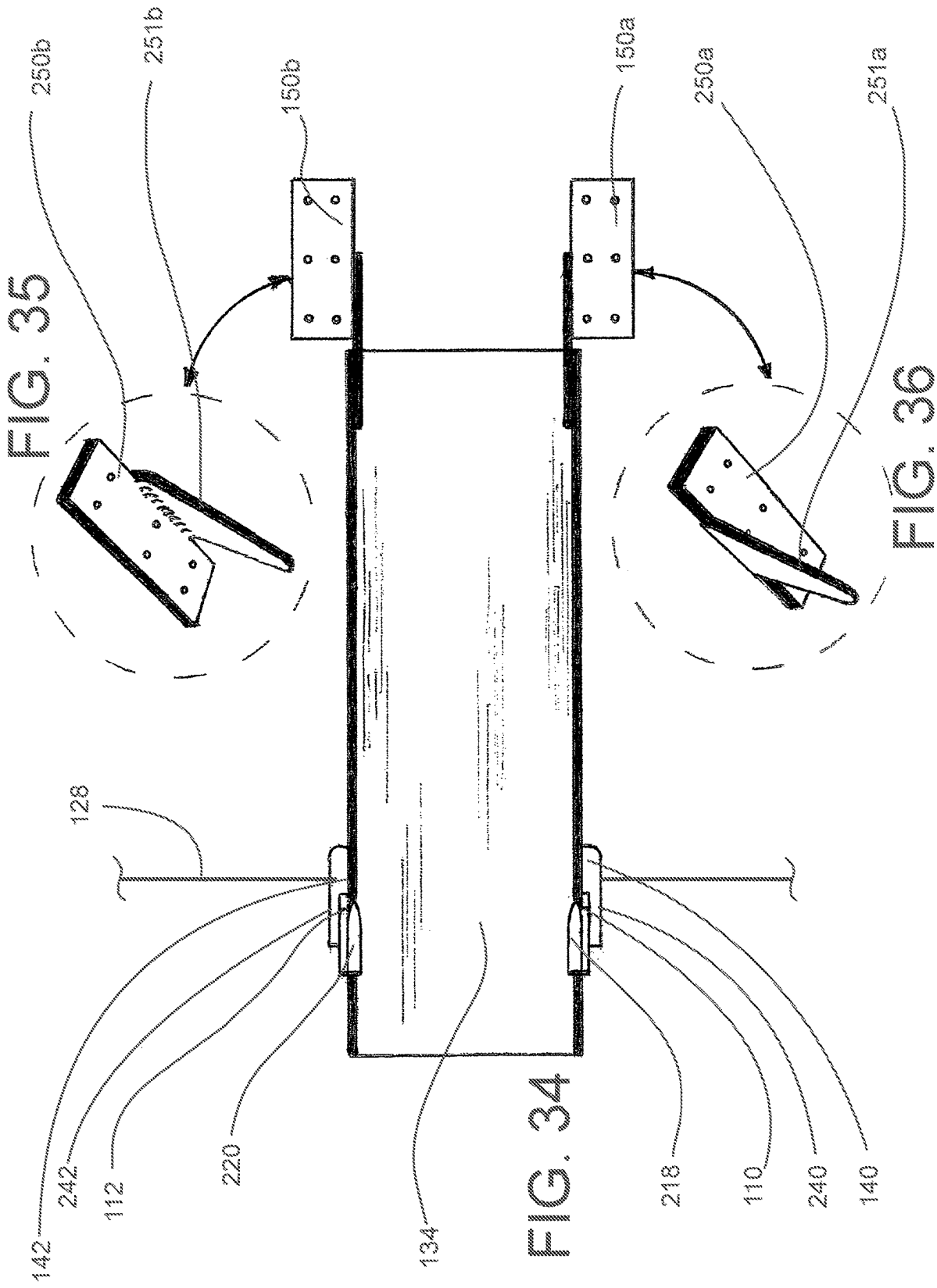

ENHANCED TRIM TAB SYSTEM WITH
FLUID HINGE FOR VARIABLE-TRANSOM
WATERCRAFTS

CROSS REFERENCE TO RELATED APPLICATIONS

The application is a continuation-in-part of application Ser. No. 17/306,595, filed May 3, 2021, which is a continuation-in part of patent application Ser. No. 16/432,393 filed Jun. 5, 2019, now U.S. Pat. No. 10,994,807, which is a continuation-in part of patent application Ser. No. 16/375,453 filed on Apr. 4, 2019, now U.S. Pat. No. 10,513,312, and a continuation-in-part of application Ser. No. 16/032,653, filed Jul. 11, 2018, now U.S. Pat. No. 10,358,195, and a continuation-in-part of application Ser. No. 15/617,365, filed Jun. 8, 2017, now U.S. Pat. No. 10,315,737, and a continuation-in-part of application Ser. No. 14/997,244, filed Jan. 15, 2016, now abandoned. All prior related patents and patent applications are herein incorporated by reference in their entirety.

FIELD OF THE INVENTION

The present invention relates to an improvement in classical trim-tab technology to enhance the general hydrodynamic performance of a marine craft inclusive of the fuel efficiency thereof.

BACKGROUND OF THE INVENTION

So-called boat leveling devices of the trim-tab type have been known for many years and various forms of them have been developed in an effort to maximize attitude control, stability of the marine craft and general hydrodynamic efficiency inclusive of decrease of flow velocity under the hull and fuel efficiency.

It is known in the art to provide a trim-tab with a physical coupling takes place at the hinging point between the flat surface of the trim-tab and the hull of a watercraft to which it attaches. This physical coupling has come in the form of a pivoting hinge, or in the form of a living hinge.

The prior art, Arnseson U.S. Pat. No. 4,909,175, demonstrates the hinge common in most trim tabs, that is, a pivot hinge that fastens the planar surface of the trim tab to the watercraft. The pivot hinge is fixed in a specific location, and requires an actuator, mounted at an non-right angle to allow the planar surface to descend.

The prior art, Weiler, U.S. Pat. No. 3,463,109, shows a similar issue where the planar surface is fastened directly to the hull of the watercraft by a living hinge. This living hinge is in a fixed location as well, and thus requires an actuator mounted at a non-right angle, or the actuator with a pivot mount to allow the planar surface of the trim tab to descend.

There are significant differences between the prior art and the current invention. Primarily, the use of a living hinge as in the prior art of Arnseson U.S. Pat. No. 4,909,175 and Weiler, U.S. Pat. No. 3,463,109, do not allow an extent of slidability for the trim tabs it connects. Arnseson uses a living hinge, which is a thin flexible hinge made from the same material as the two rigid pieces it connects. Weiler uses a pivot hinge, which allows its trim tab to raise and lower, but is limited to pivoting around its connection point. Thus, there exists a need for a fluid-hinge to allow slidability of the trim tab it connects.

These hinges in the prior art make changing a trim tab a difficult task. If a trim tab is damaged, or needs to be replaced, the operator removing the tab may further cause damage or destroy the trim-tab, as well as damage the hull of the watercraft it attaches to.

However, in my previous applications, an issue arises when an installer attempts to attach the trim tab system to the transom of a watercraft, because many watercrafts include sloped, curved, and otherwise non-linear transoms. Thus, the system of that application may require an installer to use long bolts and fill in any gaps with resin when mounting. This addition of resin increases the price of the system. The present invention eliminates this issue, allowing for a more cost effective installation.

The present inventor has obtained patents in the general area of marine technology, such as U.S. Pat. Nos. 10,035,571 B1, and 10,005,527 B2.

SUMMARY OF THE INVENTION

The invention provides a system for a transom-mount trim tab system with a fluid hinge. The system includes a trim tab having a planar surface, a forward section located under a hull of a watercraft, and a rear portion extending aft of a transom. The system also provides a forward mounting means located at the forward section of the trim tab including a pair of fluid hinge brackets, each with a mounting plate, and a containment protrusion. Yet further provided in the system is a pair of guiding tabs coupled to the trim tab. The first guiding tab in the pair of guiding tabs extends outward from a port side of said trim tab. The second guiding tab in the pair of guiding tabs extends outward from a starboard side of said trim tab.

The system further includes a pair of aft mounting brackets. The pair of aft mounting brackets include a port mounting bracket and a starboard mounting bracket. Each port mounting bracket and starboard mounting bracket is configurable for variable mounting, wherein each mounting bracket includes a vertical leg having a vertical leg upper portion and a vertical leg bottom portion. The vertical leg bottom portion is configured in a vertical orientation, and the vertical leg upper portion is configurable to be angulated relative to a transom of a watercraft. The upper portion of the vertical leg and the mounting bracket have a configurable angle there-between, wherein the angle may be enlarged or reduced resulting in an adjustment relative to a curvature in the transom of a watercraft.

It is accordingly an object of the present invention to provide an improved trim tab system which overcomes the various hydrodynamic limitations of the prior art, the same having utility with leisure as well as commercial and naval vessels.

The present invention also seeks to increase efficiency of removing and replacing a trim tab, for various reasons including replacement and cleaning, by allowing the user to disconnect the actuator from the trim tab, and slide the trim tab out of the capture of the fluid hinge, and thereby lessoning time-consumption and damage to the watercraft or trim tab due to removal as a result.

It is additionally an objective of the current invention to provide a mounting system and method for various transom shapes, including curved and sloped transoms.

It yet a further objective of the current invention to provide a trim tab system that accomplishes the above in a configuration that distributes the forces applied to the trim tab in a way that prolongs the longevity of the system.

The above and yet other objects and advantages of the present invention will become apparent from the hereinafter set forth Brief Description of the Drawings, Detailed Description of the Invention and Claims appended herewith.

BRIEF DESCRIPTION OF THE DRAWINGS

FIG. 5 shows an isometric view of the trim tab mounting brackets, of an embodiment with rounded safety catch tabs with.

FIG. 17 is a view as shown in FIG. 13, showing section cut A-A in an embodiment with rounded safety catch tabs.

FIG. 18 is a top view of section cut A-A of the embodiment shown in FIG. 17 in an embodiment with rounded safety catch tabs.

FIG. 29 is a partially exploded view of the trim tab, in combination with a guide plate, wherein the figure conceptually shows where said guide plate is coupled.

FIG. 31 is a bottom view of the trim tab system.

FIG. 32 is a perspective view of the fluid hinge bracket used in the trim tab system.

FIG. 33 is a perspective view of the fluid hinge bracket used in the trim tab system.

FIG. 34 is a bottom view of the trim tab of the system using rounded safety catch tabs.

FIG. 35 is a perspective view of the fluid hinge bracket used in the trim tab system.

FIG. 36 is a perspective view of the fluid hinge bracket used in the trim tab system.

DETAILED DESCRIPTION OF THE INVENTION

Figure 1:
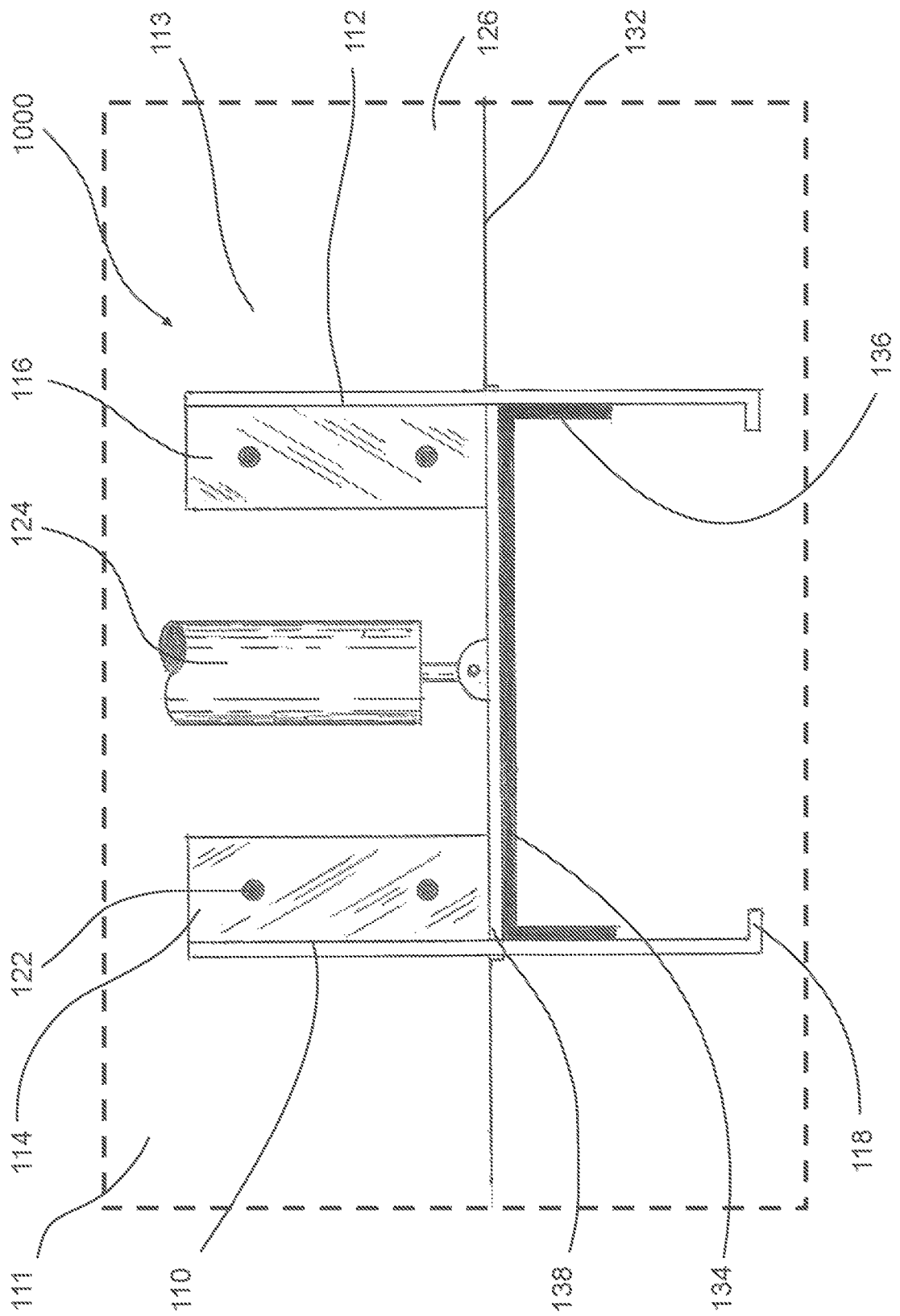
FIG. 1 shows an isolated elevation view, aft looking forward, of a transom mounted trim tab system.

Most transoms are curved rather than straight up and down. When mounting trim tab systems that include a fluid hinge, any mounting brackets that are planar require long bolts and a filling material, such as resin, to fill in the gaps. The current system overcomes these issues, and in doing so, results in a more cost effective solution. Although the current invention requires additional time for welding and bending the metal in the brackets, the customized configurations reduce extra expenses for filler material, thereby reducing the overall cost.

The current system is shown in FIGS. 1-38. It utilizes trim tab design utilizing a fluid hinge, which indicates that the trim tab 134 may move and slide, but function as a trim tab 134 without the necessity for a fixed connection or hinged connection associated with typical trim tab. However, with the use of a fluid hinge, the forces pushing against the trim tab 134 need to be supported by a bracket 111/113 so that the forces do not overwhelm or damage the actuator 124 on the trim tab 134.

As may be seen in FIGS. 1-38, a pair of brackets 111/113 have been added to each trim tab system, one on a port side of the trim tab 134, and one on a starboard side. The brackets include a mounting plate 114/116 with apertures 122 for bolts to mount the brackets 111/113. Attached to the mounting plate 114/116 is a vertical leg 110/112, which may be separated in to a top 172 and a bottom 174 portion, as may be seen in FIGS. 20 and 22, wherein the angulation between the mounting plates 176 and the vertical leg 172/174 may be angulated depending on the curvature 128 of the transom 126, as may be seen in FIGS. 7 and 8. Further, the top 172 and bottom 174 portion may also be angulated to keep the bottom portion 174 of the vertical legs in an always vertical orientation for engagement with the trim tabs 134. To prevent the rear of the trim tab 134 from descending too far down, each bracket 111/113 has a safety catch mechanism 118/120 or 218/220 to act as a barrier to catch overly lowered trim tabs 134. Because these brackets 111/113 descend below the bottom surface 132 of the hull 130 of the watercraft, a degree of drag will be present. Rounded forward edges 170 have been included to reduce this drag, as may be appreciated from FIGS. 15-18.

In some embodiments, the safety catch tabs 118/120/218/220 are welded on or formed from the metal vertical leg 110/112. This may be done for ease of manufacture, but in other embodiments, the safety catch tabs 320 are detachably coupled to the vertical legs 110/112, which allows the tabs 320 to be removed, thereby allowing the trim tab 134 to slid down and out.

Guiding tabs 140/142 are used to guide the trim tab 134 down and keep said trim tab 134 from too much front to back movement when engaging against the vertical legs 110/112. While some embodiments allow the guiding tabs to be mounted directly to the trim tab 134, a more ideal embodiment will include a guide plate 138/238 having 140/142. To assist the brackets in transferring excess force from the trim tabs 134, a guide plate 138/238 may be affixed to each trim tab 134, as may be appreciated in FIGS. 1-10, 29-20, and 37-39. By affixing a guide plate 138/238, the thickness of the trim tab 124 is doubled, and the strength of the overall trim tab 134 is increased by a factor of eight. This will help alleviate the forces taken by the actuator 124 and the thrust of the watercraft.

In some embodiments, the guide plate 138/238 also has a pair of guide tabs 140/142 on either side, wherein the guide tabs 140/142 press against the vertical legs 110/112 of the mounting brackets 111/113 to keep the trim tab 134 from shifting too far backward. In most cases, the guide tabs 140/142 are configured at different positions, as may be appreciated in FIGS. 25-28, in a front to back orientation of the trim tabs 134 because the brackets 111/113 will be mounted on a curved or sloped transom 126 and will need to engage at different points on the trim tab 134.

A forward portion 139 of the guide plates 138/238 may be skewed or off-axis so that the guiding tabs 140/142 are located proximal to the transom of a curved-transom watercraft. This can be primarily seen in FIGS. 25-28 and FIG. 7.

In some embodiments, the 140/142 on the guide plates 138/238 will have rear protrusions 240/242 that extend in an aft direction. This extension ensures that three out of the four surfaces of each vertical leg 110/112 are engaged, thereby providing a strengthening member to help absorb the forces of thrust and provide for a guided descend of the trim tab 134. These extensions 240/242 form slots 152 for which the vertical legs 110/112 fit in to are mostly used in high-pressure installations because the vertical legs 110/112 cannot move out from the pressure exerted. On some larger boats, without these slots, the force from the trim tab 134 may press on the vertical legs 110/112 causing them to bow out and warp the legs 110/112, wherein the trim tab 134 will then be pushed out, causing severe damage to the overall system. The slots 152 remove this issue by securing the vertical path of the trim tab 134 around the vertical legs 110/112.

This system, when utilized properly, allows watercrafts to run at a zero-degree lift, which allows the boat to remain horizontal. This preserves the underside of the hull of the watercraft, as the bottom surface of the hull receives less pounding from waves. A user may also notice that the waves generated at the bow of the watercraft will turn in to a mist rather than waves.

Figure 2:
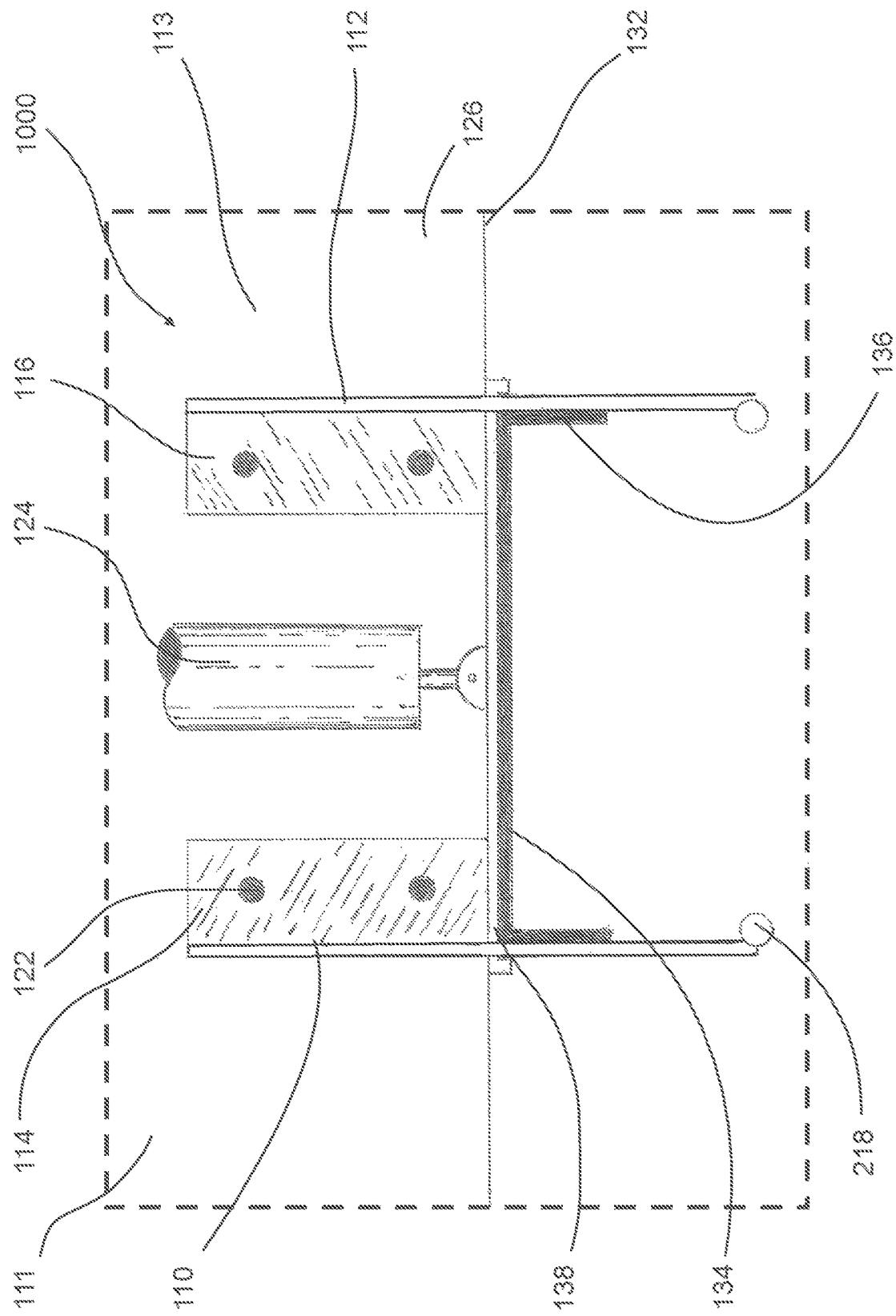
FIG. 2 shows an isolated elevation view, aft looking forward, of a transom mounted trim tab system with rounded safety catch tabs.
Figure 3:
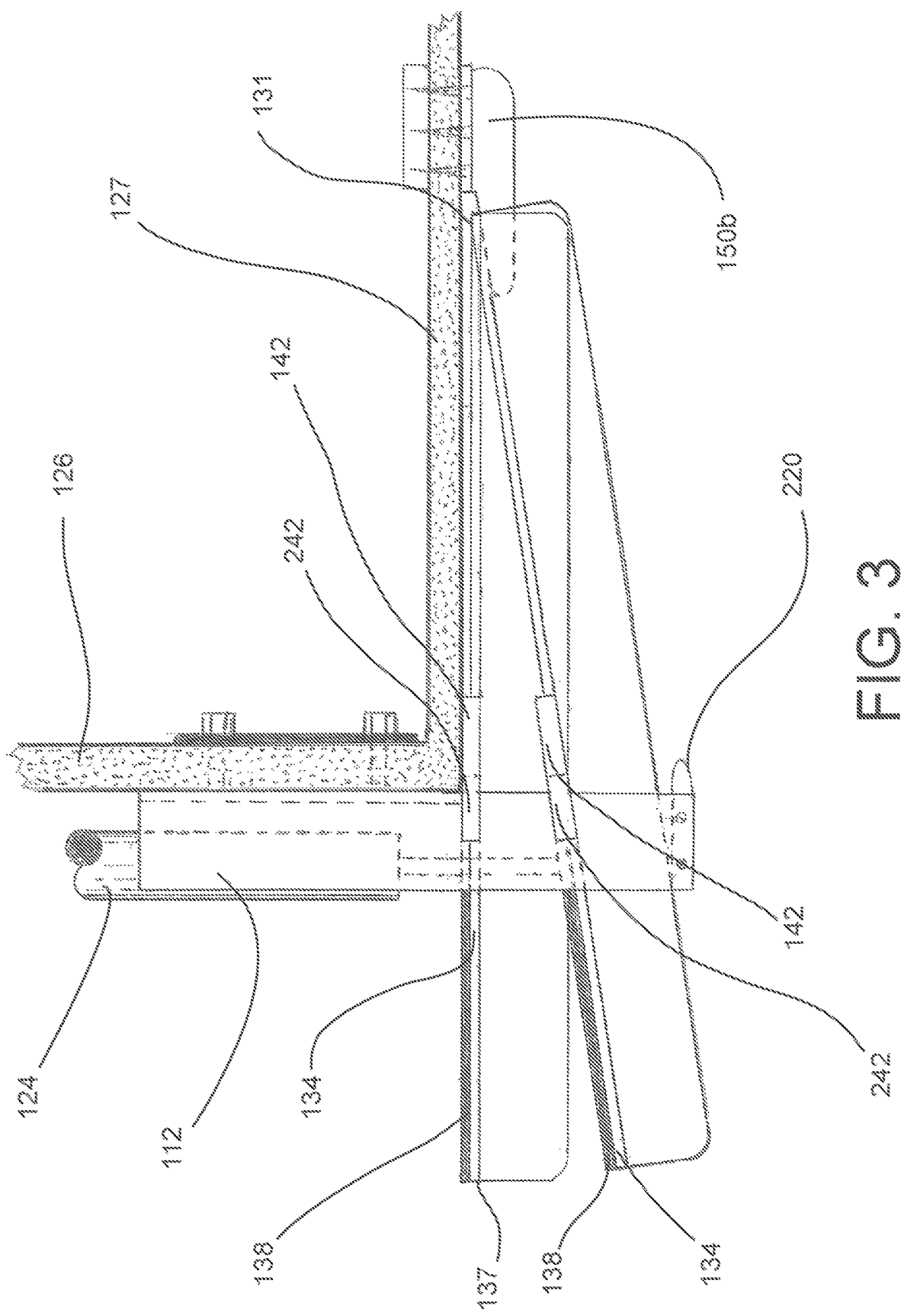
FIG. 3 shows a side view of the trim tab system indicating both a raised and lowered trim tab.

FIGS. 1 and 2 show isolated elevation views of a transom mounted trim tab system 1000. As may be seen, the figures show the left and right mounting brackets 111/113, comprising the vertical legs 110/112, safety catch tab 118/218, mounting plates 114/116, including apertures 122 therein. The guiding plate 138/238 may also be seen attached to the trim tab 134, wherein the shown embodiment also has sidewalls 136 for the trim tab 134, wherein the sidewalls provides structural support for the trim tab 134. FIGS. 1 and 2 also shows the system 1000 relative to the transom 126 of the watercraft, and the relative to the bottom surface 132 of the hull.

Figure 4:
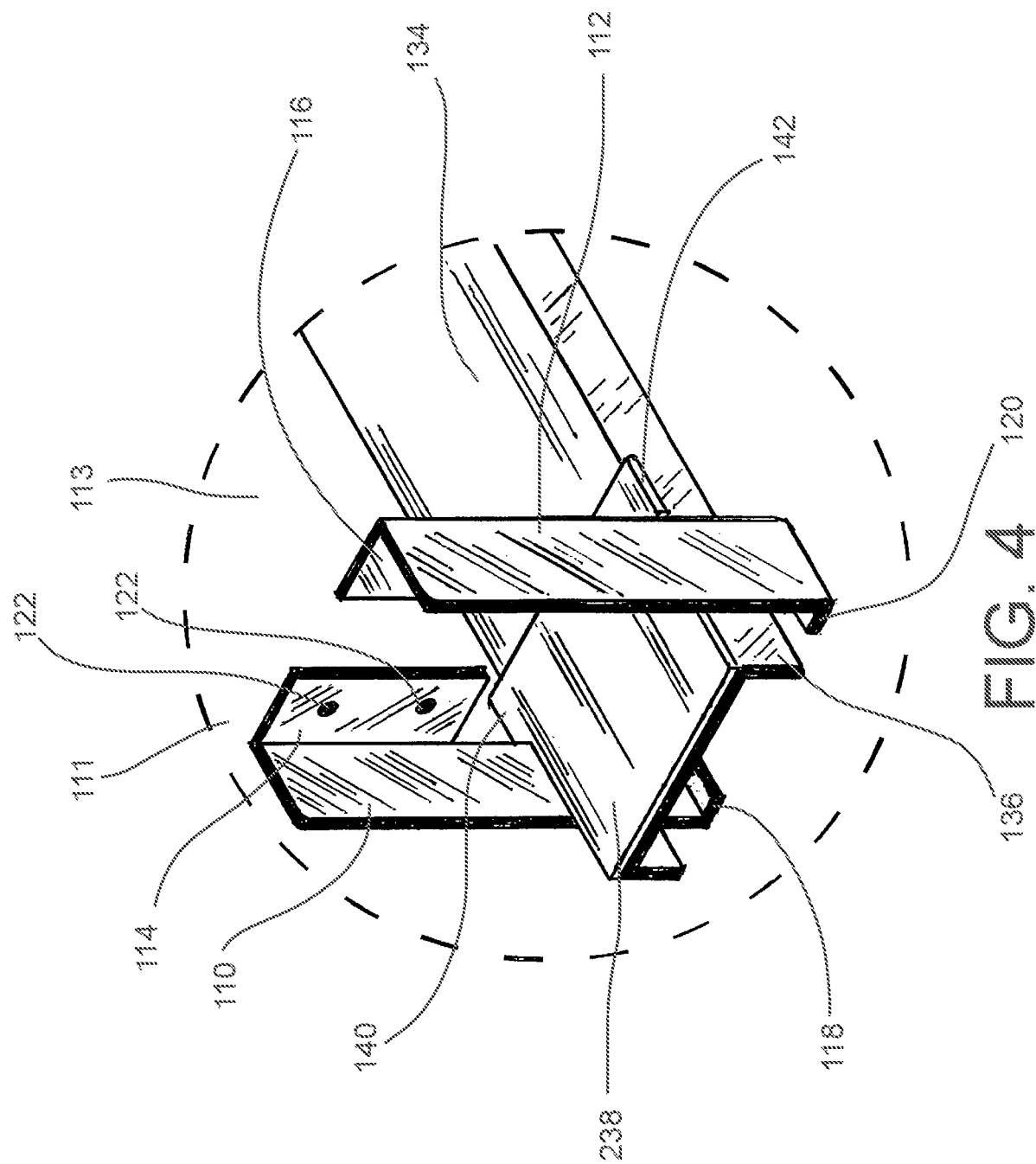
FIG. 4 shows an isometric view of the trim tab with mounting brackets.
Figure 5:
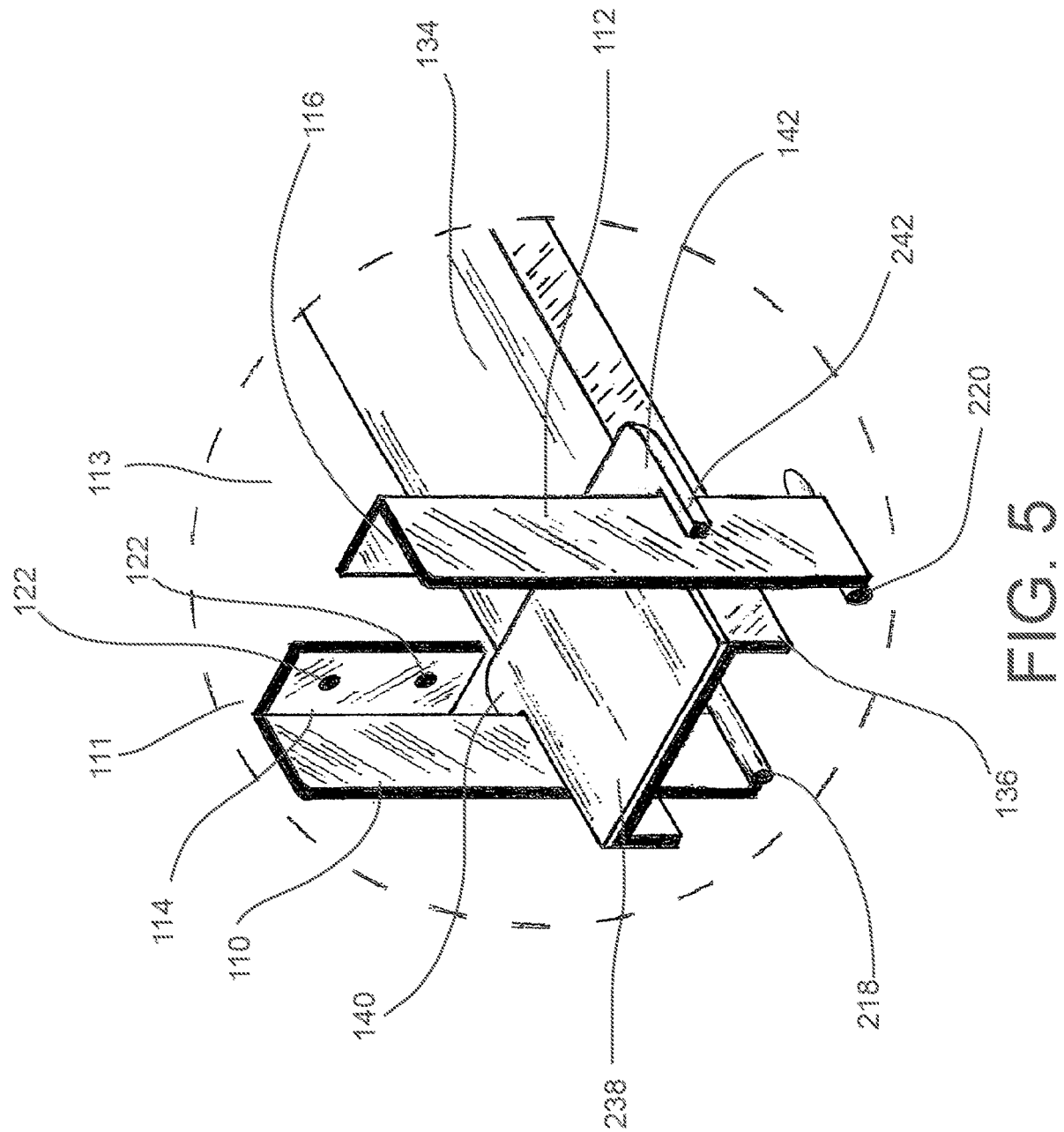

FIGS. 4 and 5 show isometric views of the system 1000 with trim tab 134 with mounting brackets 111/113. FIGS. 4 and 5 focuses on the core elements of novelty disclosed, including the guiding plate 138/238 coupled to the trim tab 134, wherein the guiding tabs 140/142 may be seen engaging with the vertical legs 110/112 of the brackets 111/113, to thereby receive the force of thrust against the trim tab 134. FIG. 5 also incorporates the rearward protrusions 242, which help contain the vertical leg and prevent the vertical legs 110/112 from bowing out. The mounting brackets 114/116 are also shown, wherein apertures 122 may be appreciated for mounting the brackets to a transom (not shown in FIGS. 4 and 5). As may be additionally appreciated in FIG. 4, safety catch tabs 118/120 may be seen in an orientation which shows the extension beyond the sidewalls 136 of the trim tab 134, wherein the safety catch tabs 118/120 will allow the sidewalls 136 to rest on the safety catch tabs 118/120 when the force of thrust is not pushing up on the trim tab 134. FIG. 5 shows a variant of these safety catch tabs, in which the safety catch tabs 218/220 shown in FIG. 5 are rounded, which may also produce better hydrodynamics. These safety catch tabs 218/220 may be mounted in the inside of the vertical legs 110/112, as shown in FIG. 5, or mounted on the outside, such as the safety catch tabs 320 shown in FIG. 6.

Figure 6:
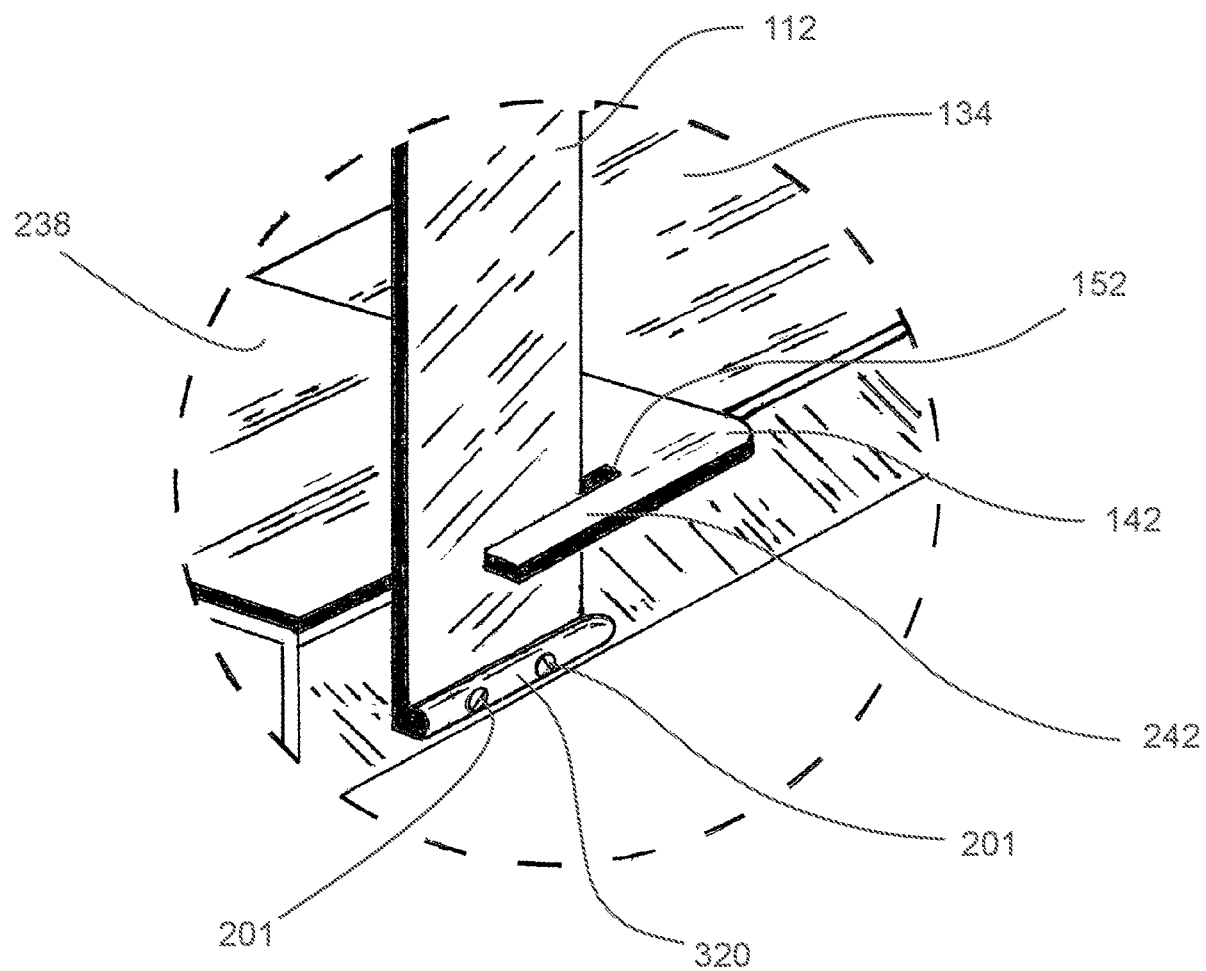
FIG. 6 shows an isolated enlarged view of a removable safety catch tab with rounded geometry.

Also shown in FIG. 6 are optional screws 201 that mount the safety catch tabs 320 to the vertical legs 112. The screws allow the tabs to be removed from the vertical legs, which is important when periodically removing the trim tabs 134 from the system for cleaning or when replacing the trim tab 134. In some embodiments, the safety catch tabs may be welded or formed from the vertical legs and cannot be removed, but if the safety catch tabs are screwed in, they can be removed for various reasons. The screws may be implemented in all types of safety catch tabs, including the flat tabs 118/120 and rounded tabs 218/220.

Figure 7:
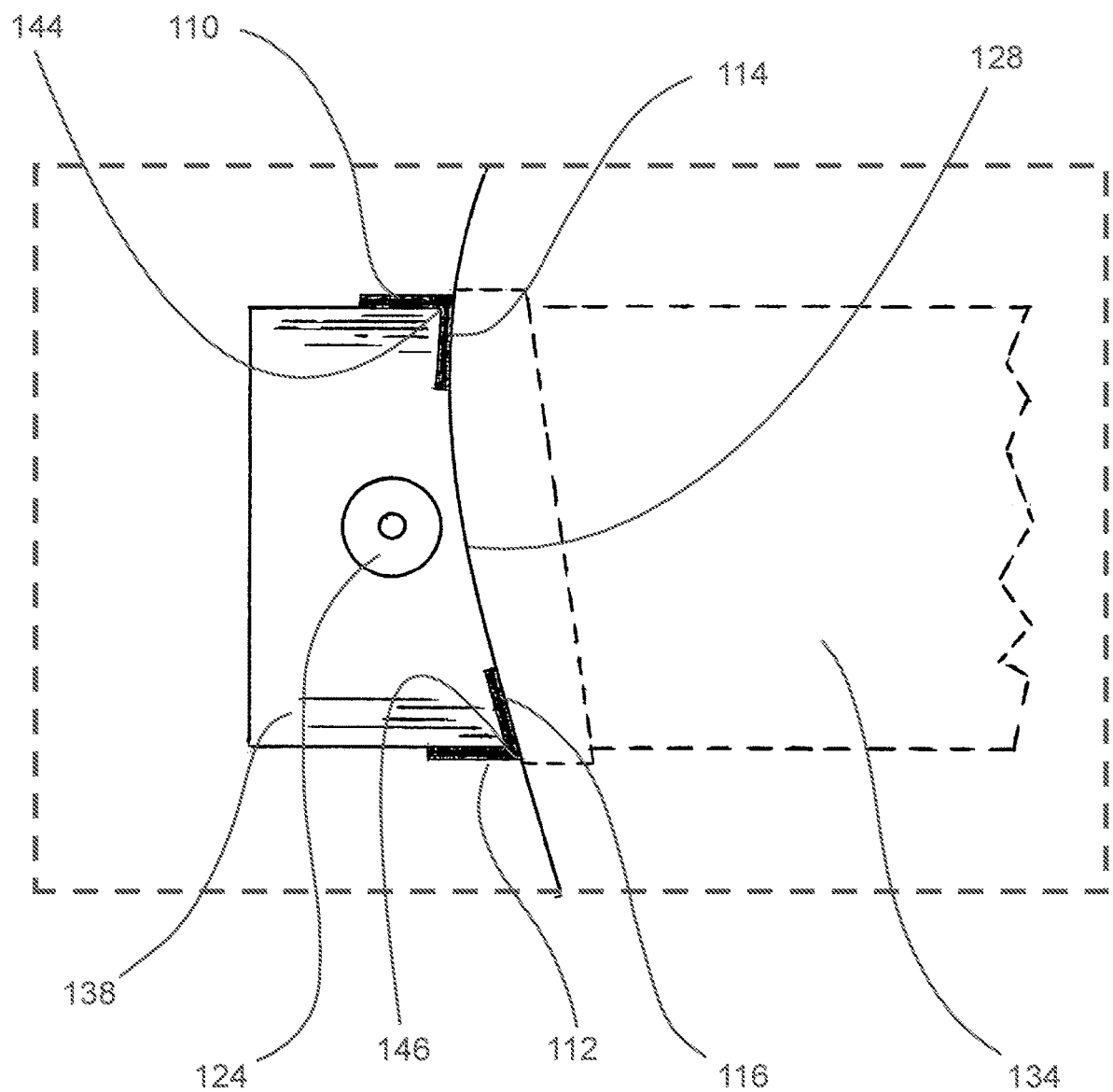
FIG. 7 is a top plan view of the trim tab of the system, with the entire trim tab shown in phantom, and a asymmetrical guiding plate.
Figure 8:
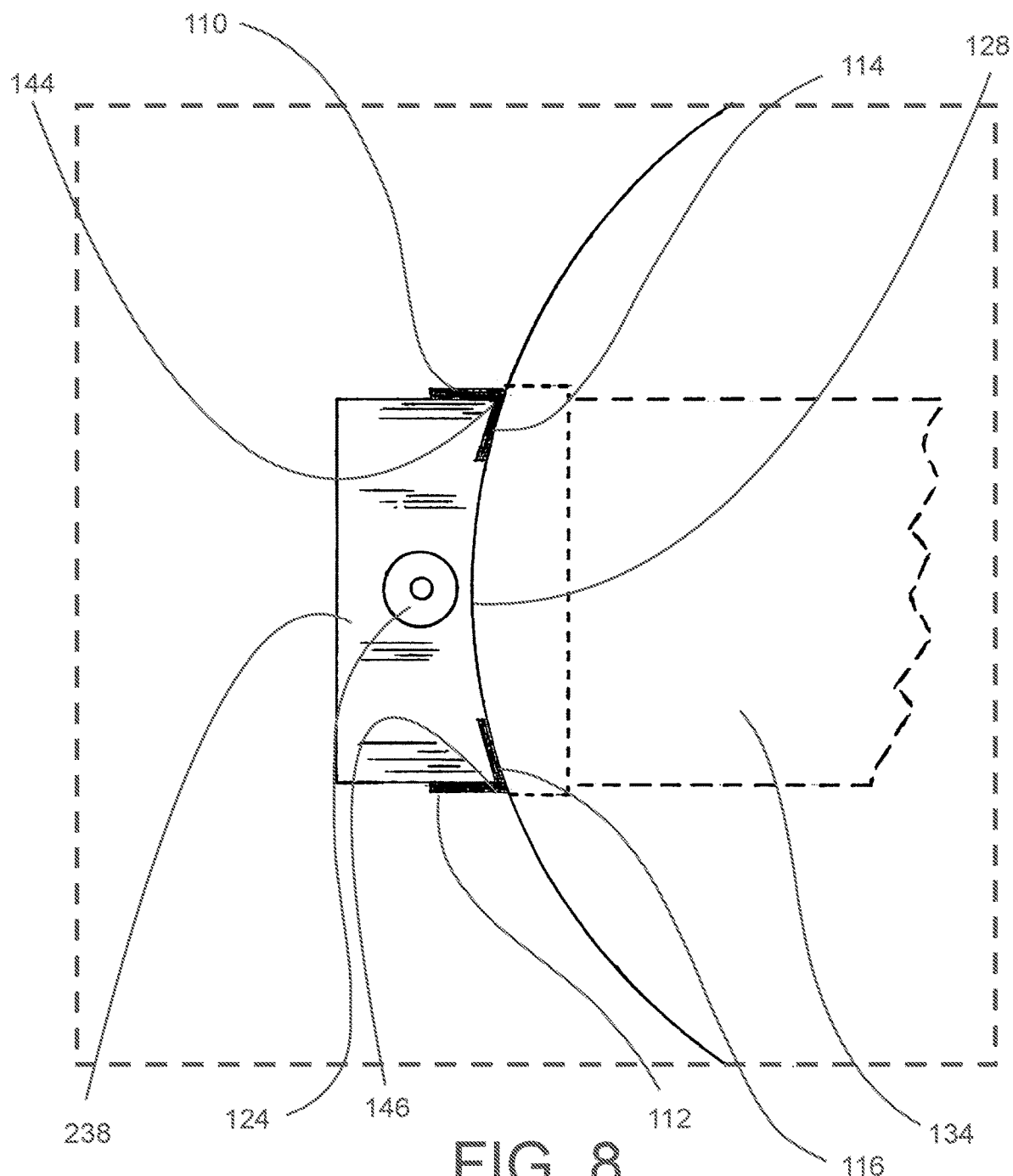
FIG. 8 is a top plan view of the trim tab of the system, with the entire trim tab shown in phantom, and a symmetrical guiding plate.

FIGS. 7 and 8 are top plan views of the trim tab of the system 1000, with the entire trim tab 134 shown in phantom. FIG. 7 shows a guiding plate 138 with off-axis arrangement, and FIG. 8 shows a guiding plate 238 with on-axis arrangement. The guiding plate 138/238 is seen protruding from the transom boundary 128 of the watercraft. The guiding plate can be seen to engage with the brackets with mounting plate 114/116 and vertical legs 110/112. The actuator 124 is also shown in FIGS. 7 and 8. As may be appreciated from the top view, angulation 144 exists between the left mounting plate 114 and left vertical leg, wherein the angle depends on the curvature of the transom boundary 128. Similarly, angulation 146 is influenced by the right mounting plate 116 and right vertical leg 112. Because the transom boundary 128 is curved, the viewer should also appreciate that the guiding plate 138 will be configured to have guiding tabs (shown in FIGS. 23-28) that are located at different points along the trim tab 134, that is, the vertical leg will be mounted in a close proximity to mounting points along the curved transom, but the trim tabs will be in a front to back axial orientation, thus, the vertical legs will have to be mounted relative to different points along the trim tab 134. The guiding plate 138/238 helps keep these brackets engaged with the trim tab. Further, it may be appreciated that in some embodiments, the guiding tabs may be incorporated in to the trim tab itself without the use of a guiding plate 138/238 as shown, wherein the additional tabs may be considered the guiding plate without a physically separate piece of material, and such embodiments should be understood to be incorporated under the broadest reasonable interpretation of the claims.

Figure 9:
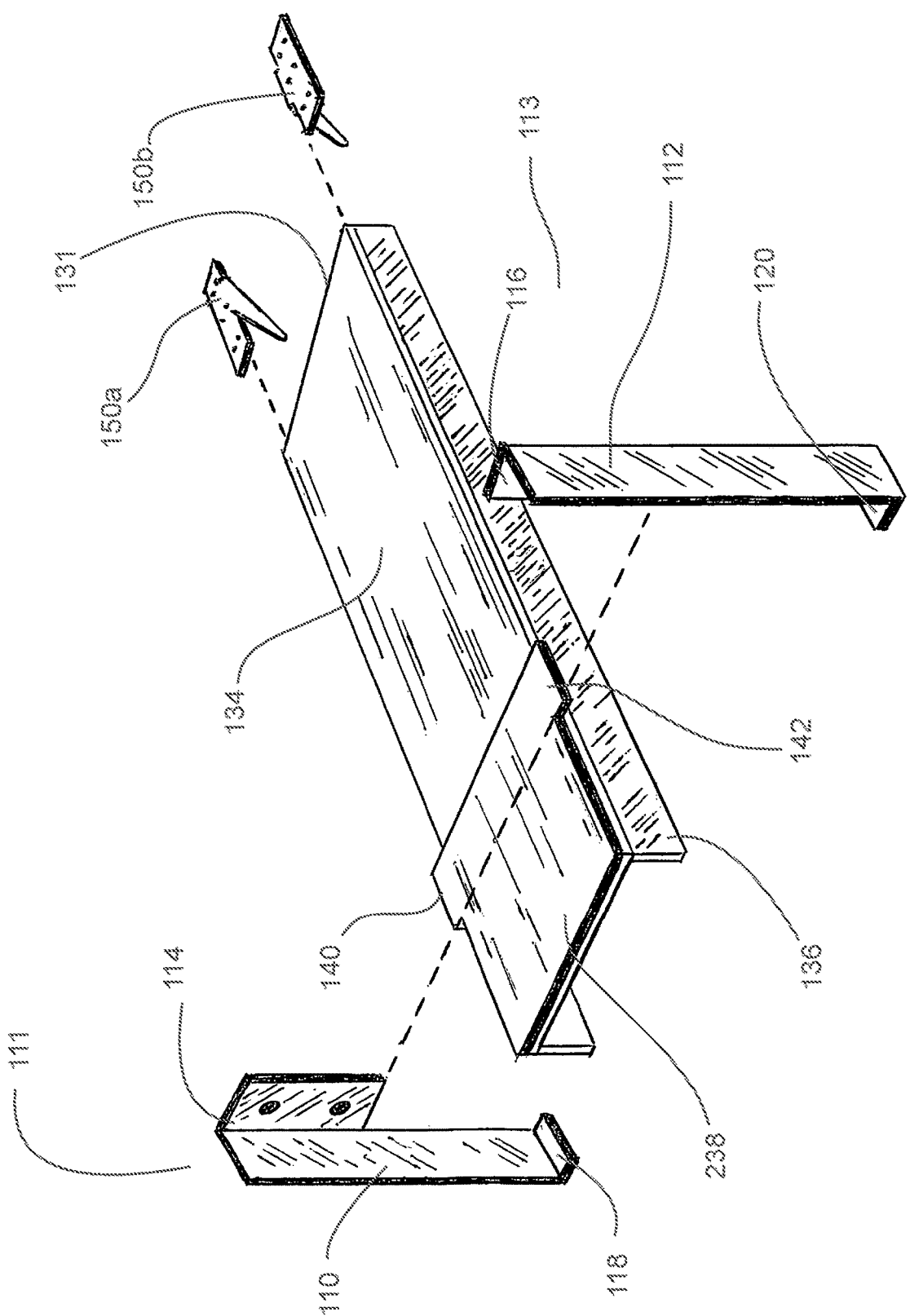
FIG. 9 is an exploded view of the trim tab system components of the trim tab, mounting brackets, fluid hinge brackets and guide plate.
Figure 10:
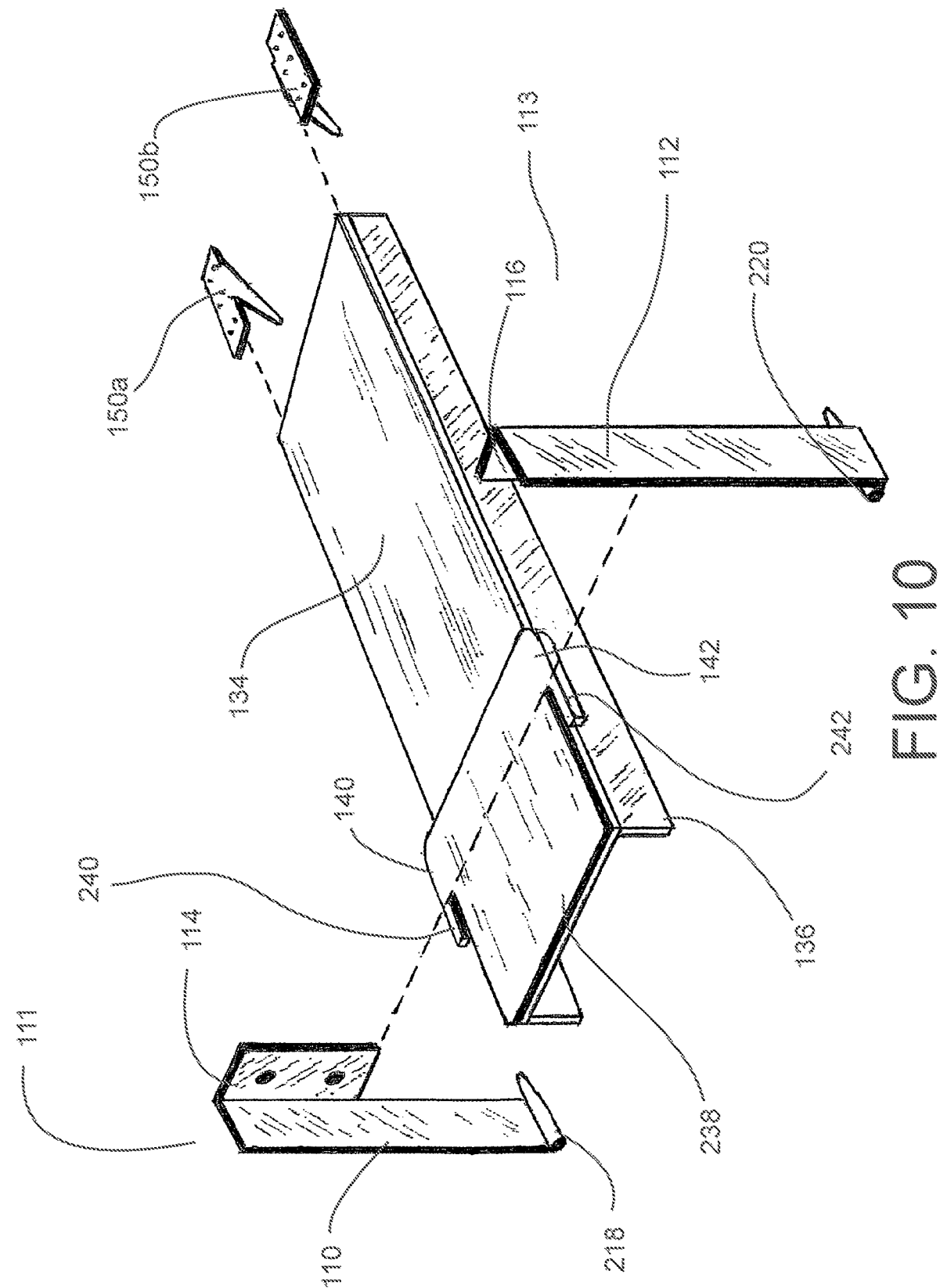
FIG. 10 is an exploded view of the trim tab system components of the trim tab, mounting brackets, fluid hinge brackets, rounded safety catch tabs, and guide plate.

FIGS. 9 and 10 are exploded views of the trim tab system 1000 components of the trim tab 134, mounting brackets 111/113, and guide plate 138/238. The alignment may be seen from this view. Left mounting bracket 111 may be seen to include the vertical leg 110, mounting plate 114, and safety catch tab 118/218. Right mounting bracket 113 may be seen to include the vertical leg 112, mounting plate 116, and trim tab safety catch tab 120/220. The trim tab embodiment is shown to have sidewalls 136. Further, toward the front of the trim tab 134 in the figures show the fluid hinge brackets 150a/150b (also shown more specifically in FIGS. 31-36).

Figure 12:
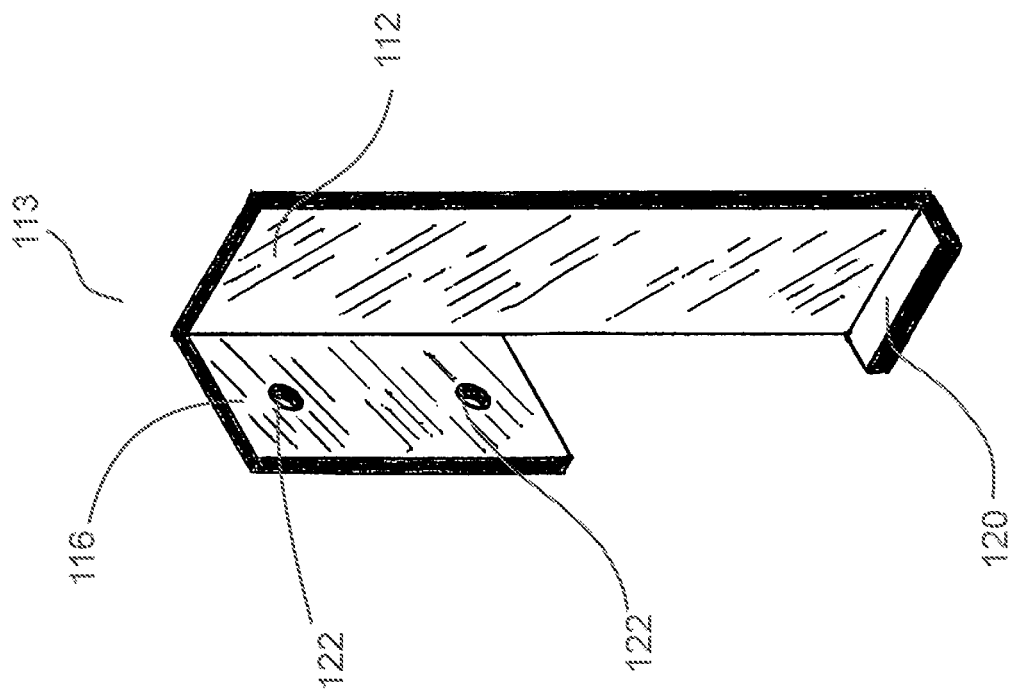
FIG. 12 is a perspective view of a right mounting bracket of the trim tab system in an embodiment with rounded safety catch tabs.
Figure 11:
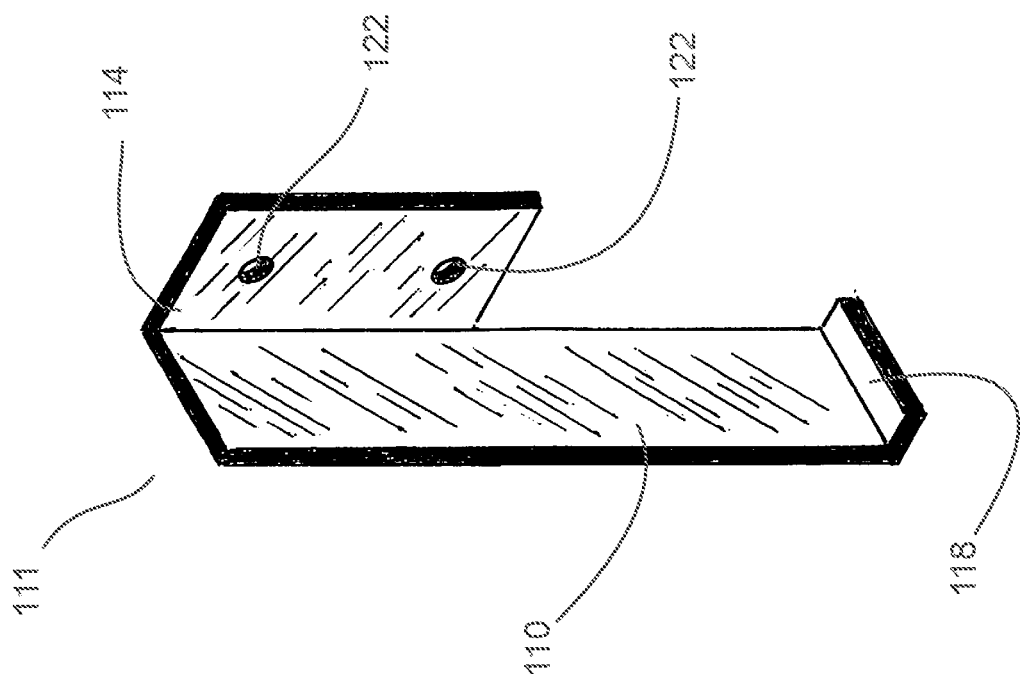
FIG. 11 is a perspective view of a left mounting bracket of the trim tab system.
Figure 14:
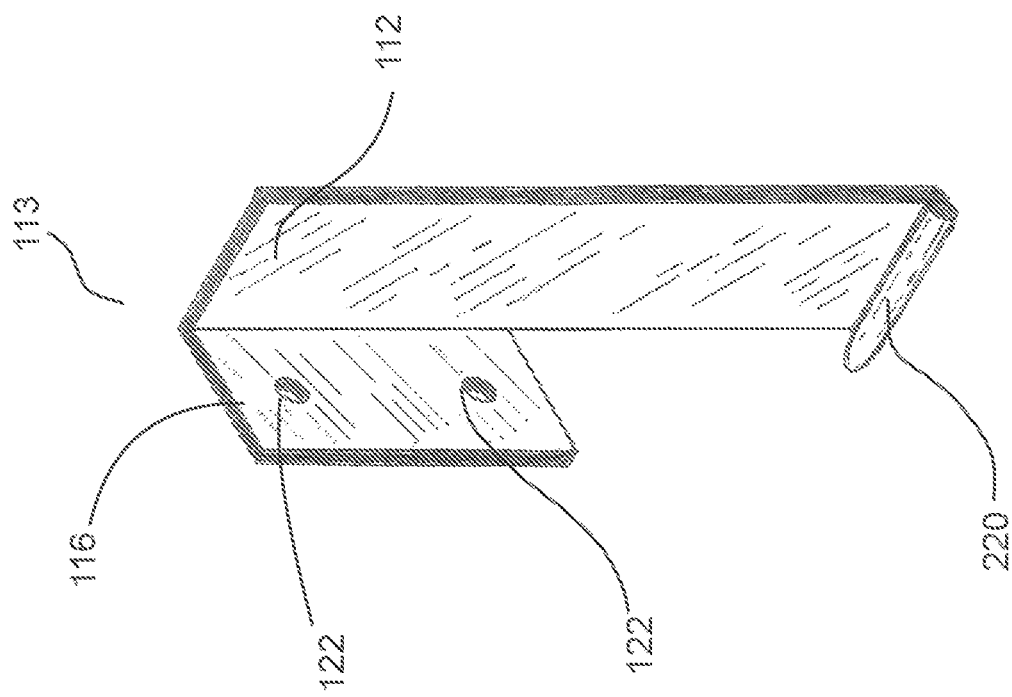
FIG. 14 is a perspective view of a left mounting bracket of the trim tab system in an embodiment with rounded safety catch tabs.
Figure 13:
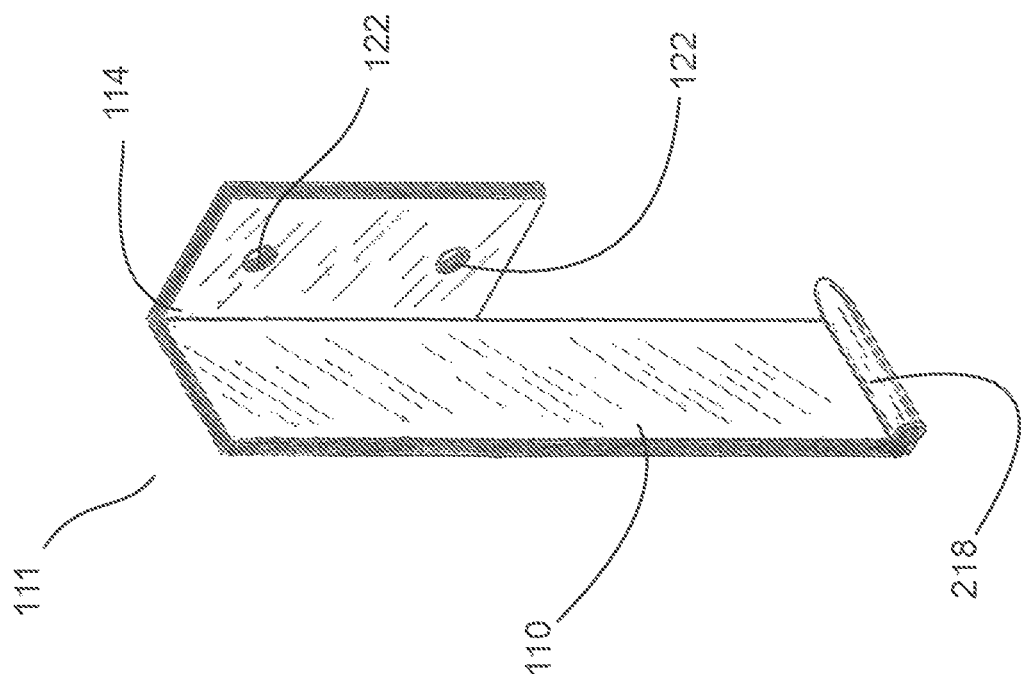
FIG. 13 is a perspective view of a left mounting bracket of the trim tab system in an embodiment with rounded safety catch tabs.

FIG. 11 is a perspective view of a left mounting bracket 111 of the trim tab system 1000. The figure particularly points out the left mounting plate 114, left vertical leg 110, left safety catch tab 118, and mounting apertures 122. FIG. 12 is a perspective view of a right mounting bracket 113 of the trim tab system 1000. The figure particularly points out the right mounting plate 116, left vertical leg 112, left safety catch tab 120, and mounting apertures 122. FIGS. 13 and 14 are similar to FIGS. 11 and 12, respectively, however, FIGS. 13 and 14 show a different embodiment of the safety catch tabs 218/220 with a rounded construction.

Figure 16:
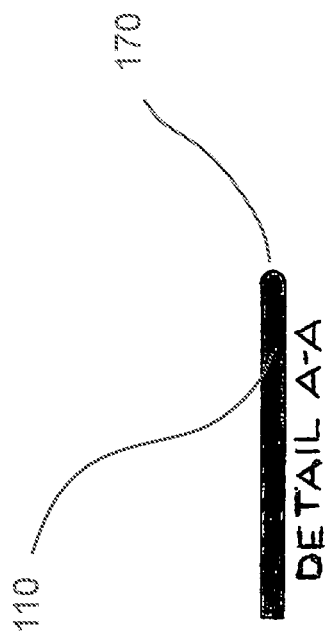
FIG. 16 is a top view of section cut A-A of the embodiment shown in FIG. 15.
Figure 15:
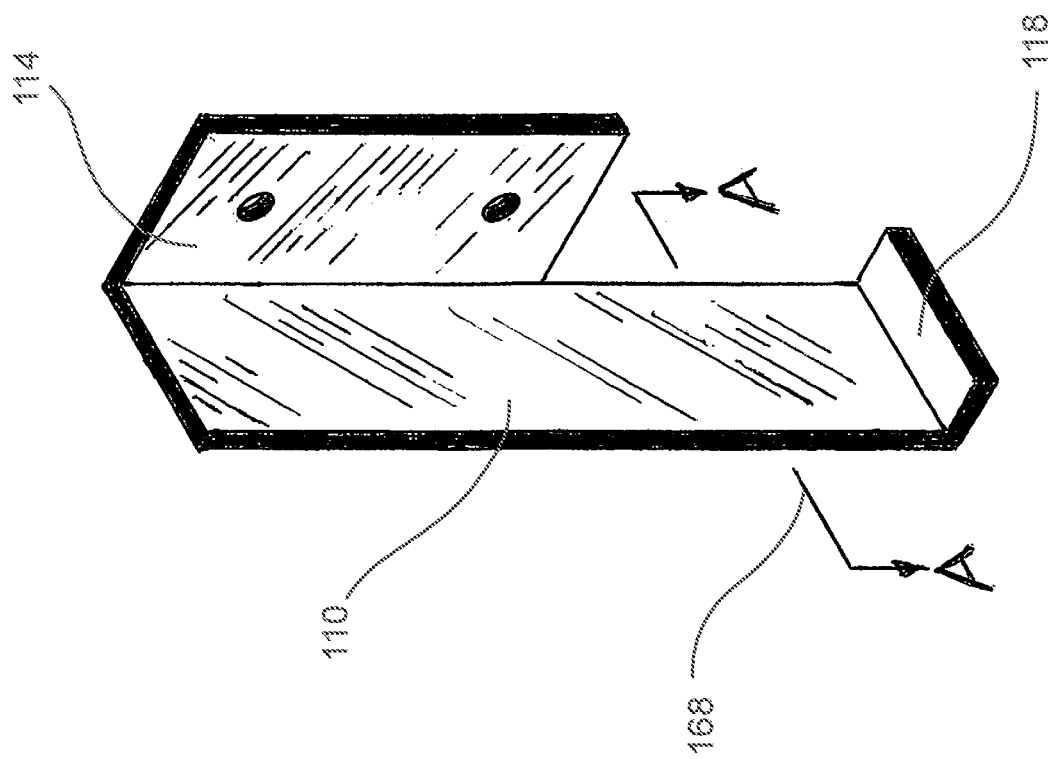
FIG. 15 is a view as shown in FIG. 11, showing section cut A-A.

FIG. 15 is a view as shown in FIG. 11, including the mounting plate 114 and vertical leg 110, but also showing section cut A-A 168. FIG. 16 is a top view of section cut A-A 168 of the embodiment shown in FIG. 15. As may be appreciated, the front portion of the vertical leg 110 is a rounded edge 170, which helps reduce forces acting on the vertical leg, and increase hydrodynamic efficiency. Because the vertical legs 110 descent below the hull of the watercraft, it is important to optimize the surfaces to reduce drag on the system. FIGS. 17 and 18 are similar to FIGS. 15 and 16, respectively, however, FIGS. 17 and 18 show a different embodiment of the safety catch tabs 218/220 with a rounded construction.

Figure 20:
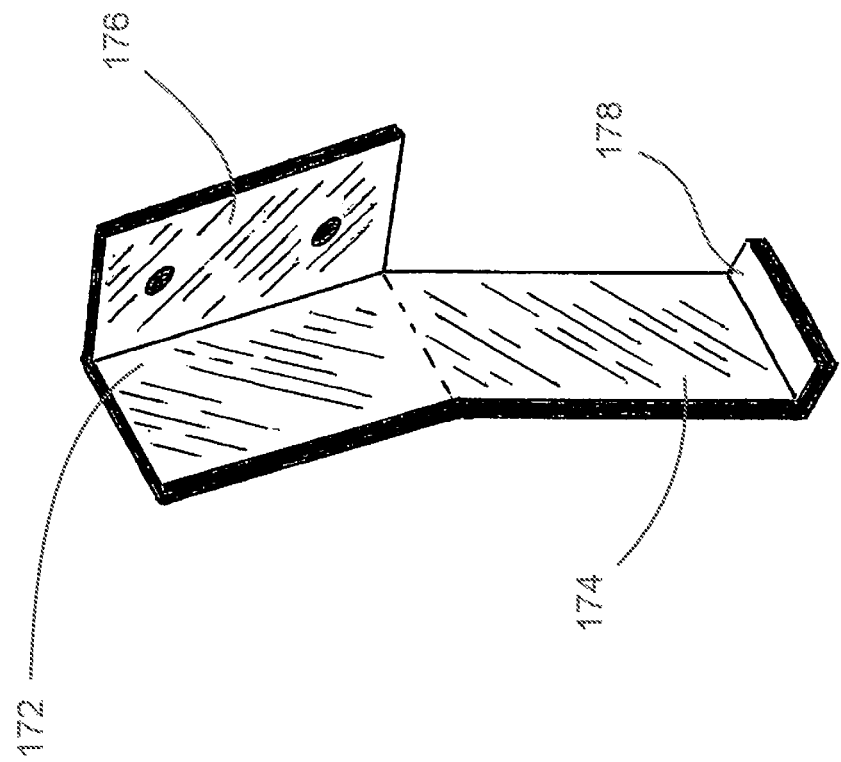
FIG. 20 is an alternative configuration of the bracket shown in FIG. 19, configured to a vertically angulated and horizontally curved transom surface.
Figure 19:
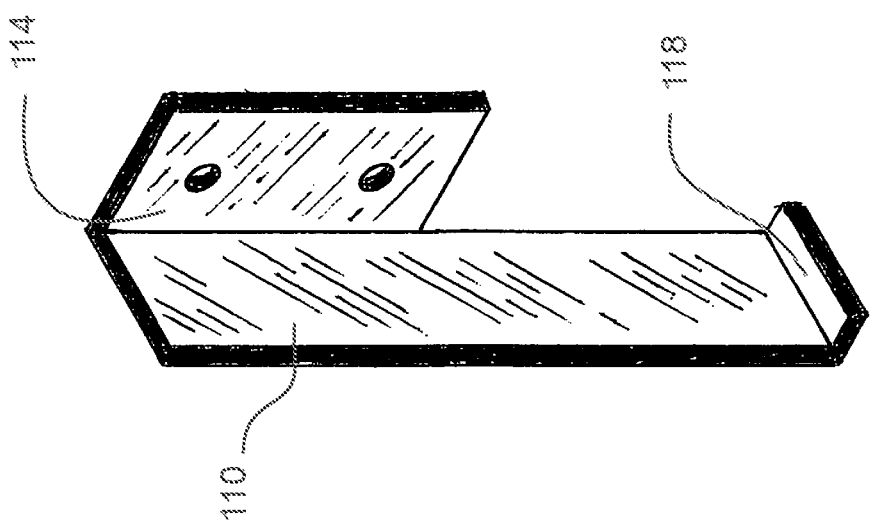
FIG. 19 is a perspective view of a left bracket of the system, as shown in FIGS. 11 and 15.
Figure 22:
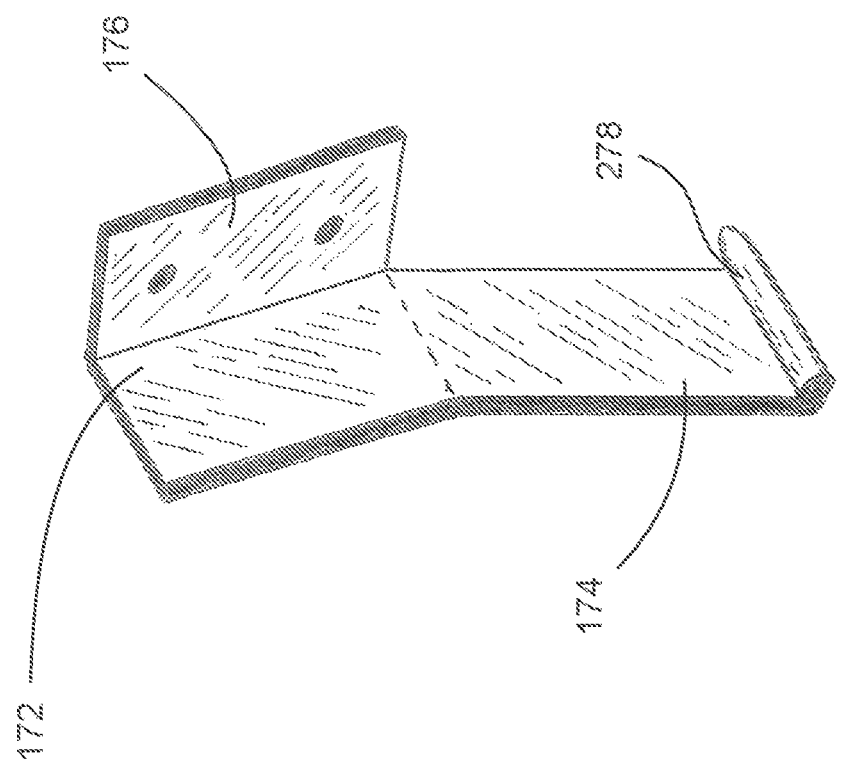
FIG. 22 is an alternative configuration of the bracket shown in FIG. 19, configured to a vertically angulated and horizontally curved transom surface in an embodiment with rounded safety catch tabs.
Figure 21:
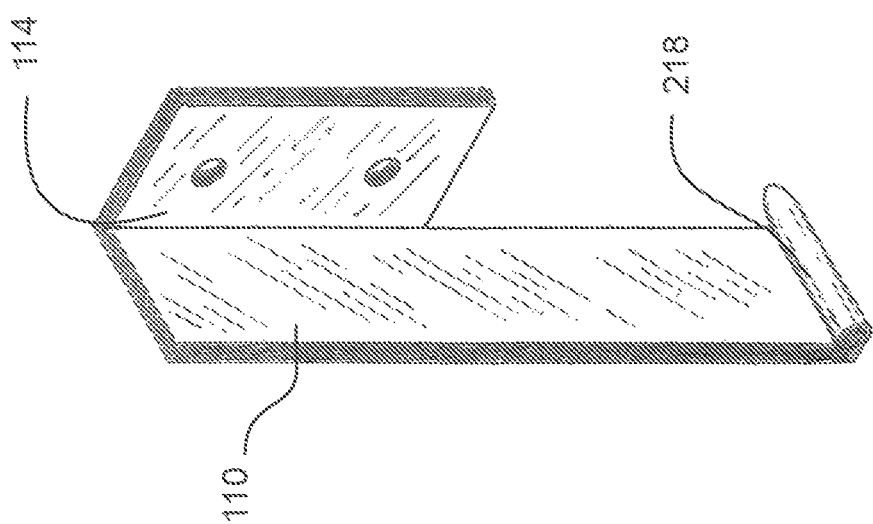
FIG. 21 is a perspective view of a left bracket of the system, as shown in FIGS. 13 and 17 in an embodiment with rounded safety catch tabs.

FIG. 19 is a perspective view of a left bracket of the system, including mounting plate 114, vertical leg 110, and safety catch tab 118, as similarly shown in FIGS. 11 and 12. FIG. 20 is an alternative configuration of the bracket shown in FIG. 19, configured to a vertically angulated and horizontally curved transom surface. Because surfaces of a transom exist in a polar curvature (curving left and right as well as up and down), the brackets will likely not be strictly vertical, as shown in FIG. 19. Thus, in many cases, the brackets will have a top portion 172 of the vertical leg and a bottom portion 174 of the vertical leg, wherein both may be angulated. The mounting plate 176 will also be angulated as well. FIG. 20 also shows the safety catch tab 178 for the angled embodiment of the brackets. FIGS. 21 and 22 are similar to FIGS. 19 and 20, respectively, however, FIGS. 21 and 22 show a different embodiment of the safety catch tabs 218/220 with a rounded construction.

Figure 23:
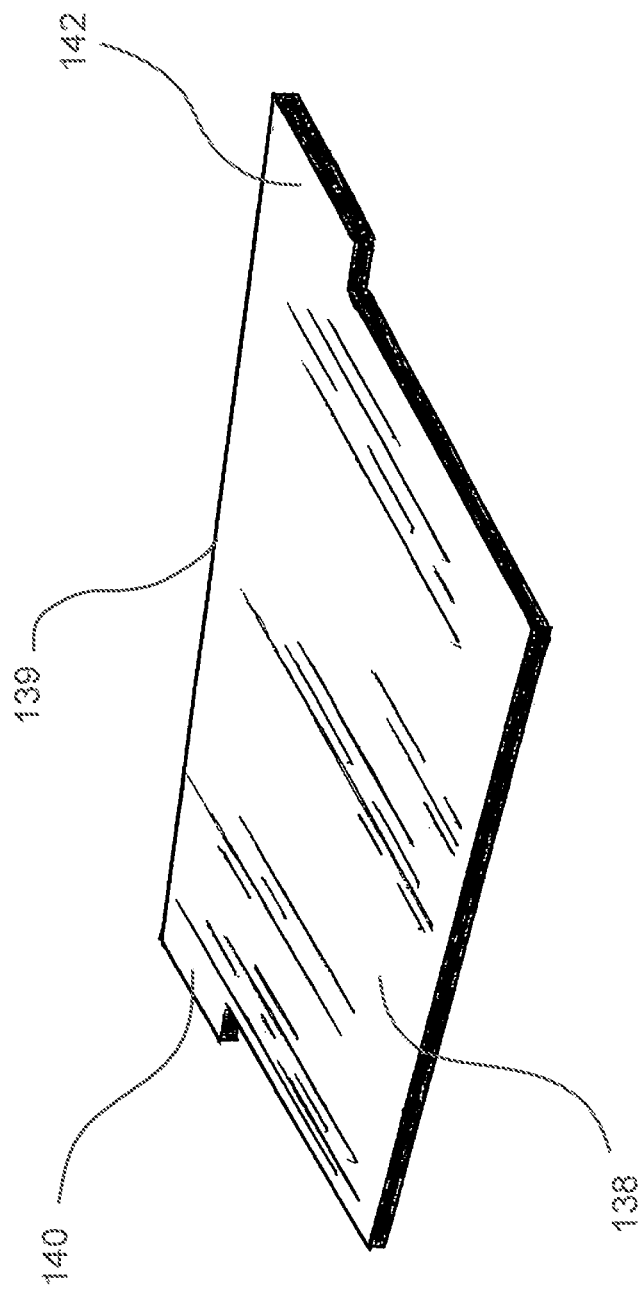
FIG. 23 is a perspective view of the guiding plate.
Figure 25:
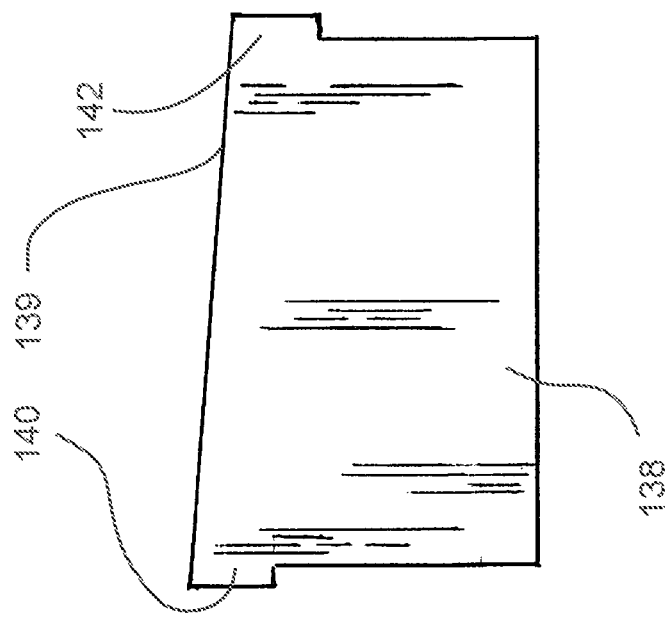
FIG. 25 is a top plan view of a guide plate showing an off-axis orientation of the guiding tabs.
Figure 26:
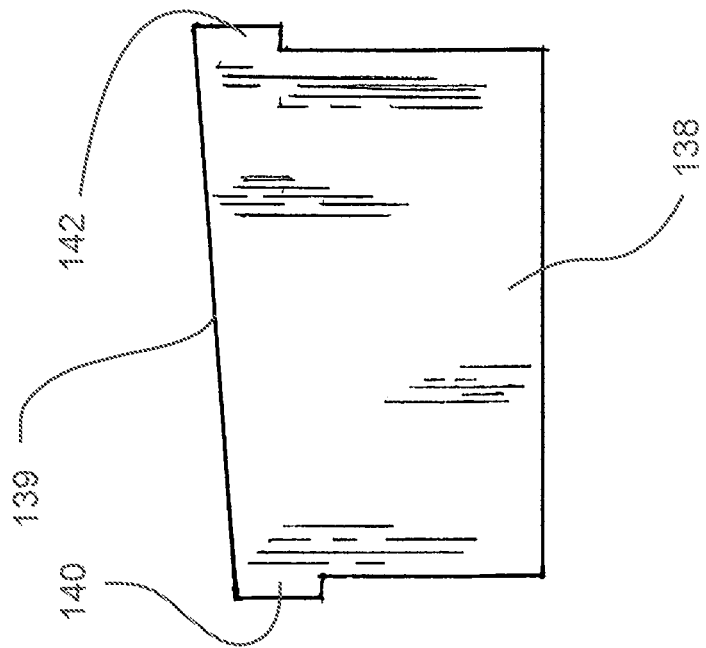
FIG. 26 is a top plan view of an alternative guide plate, similar to FIG. 8A, showing an off-axis orientation of the guiding tabs.

FIGS. 23, 25, and 26 show the guiding plate 138 and associated guiding tabs 140/142. FIG. 23 is a perspective view, 25 is a top plan view, and 26 is an alternate plan view. As may be appreciated in the comparison of FIGS. 25 and 26, the guiding tabs 140/142 are not equidistant from the end portion of the trim tab 134 (As may be seen in FIG. 29). That is because the brackets will likely be mounted in close proximity to a curved transom, wherein the curvature will skew where the brackets engage on the trim tab.

Figure 24:
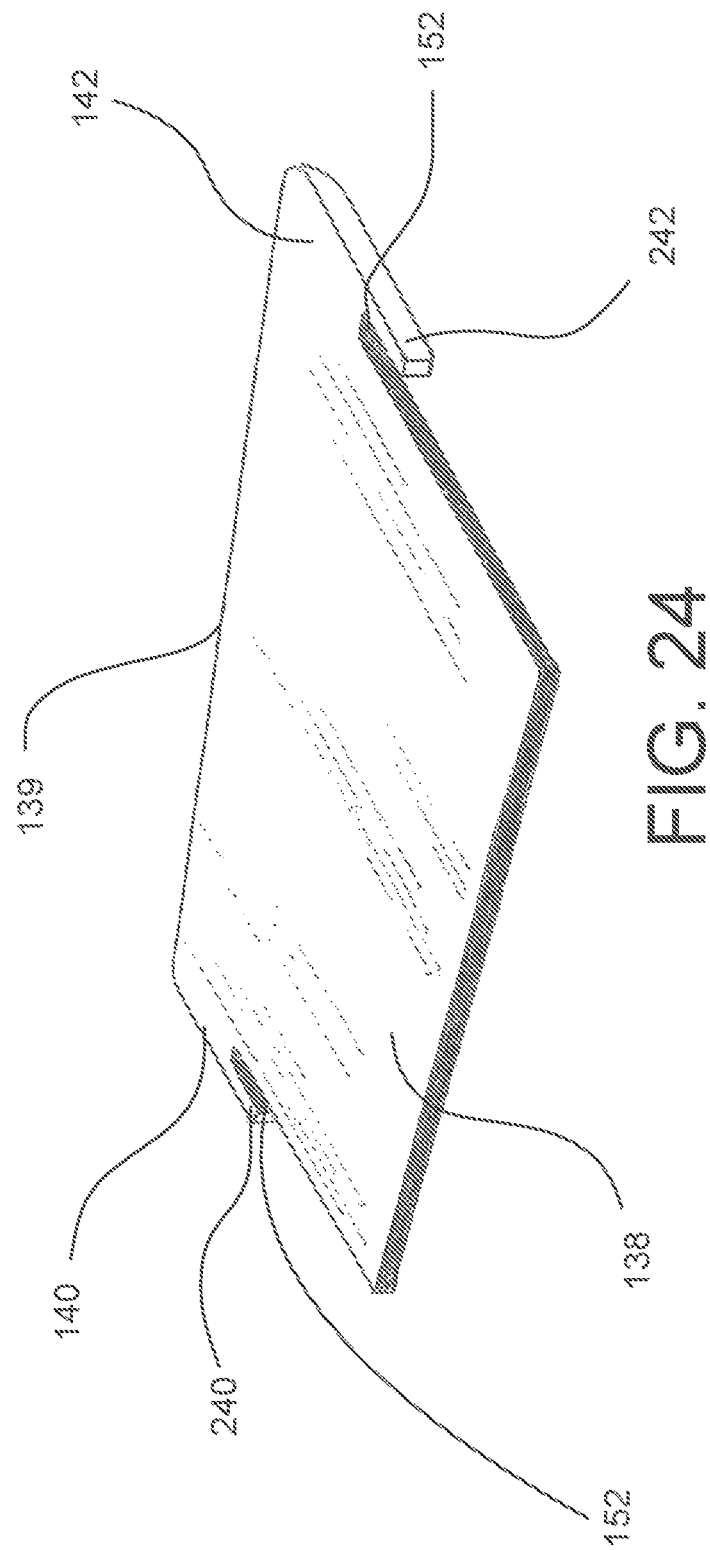
FIG. 24 is a perspective view of the guiding plate with rear protrusions from the guiding tabs.
Figure 28:
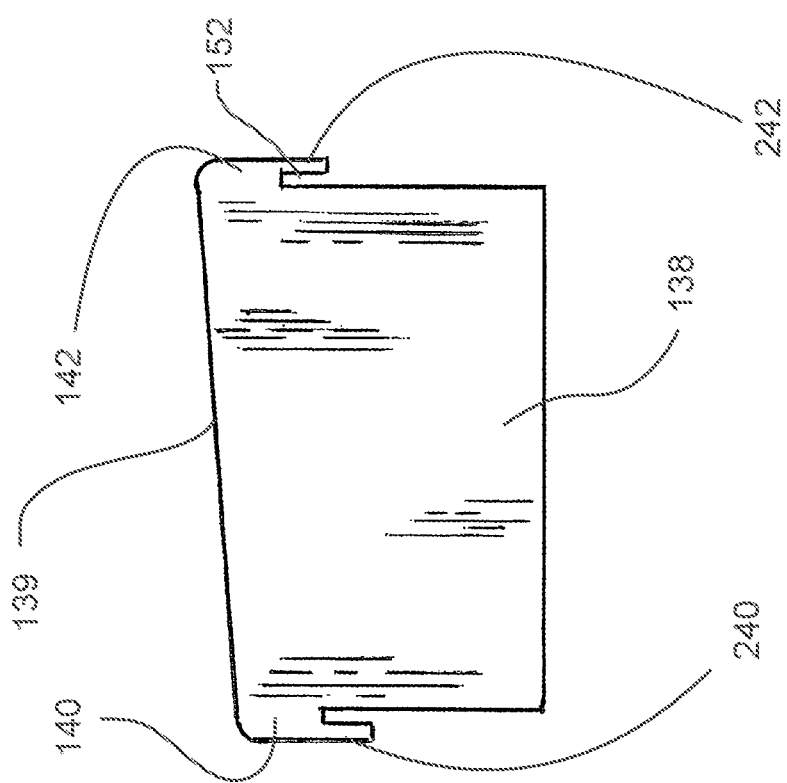
FIG. 28 is a top plan view of an alternative guide plate, similar to FIG. 8A, showing an off-axis orientation of the guiding tabs with rear protrusions from the guiding tabs.
Figure 27:
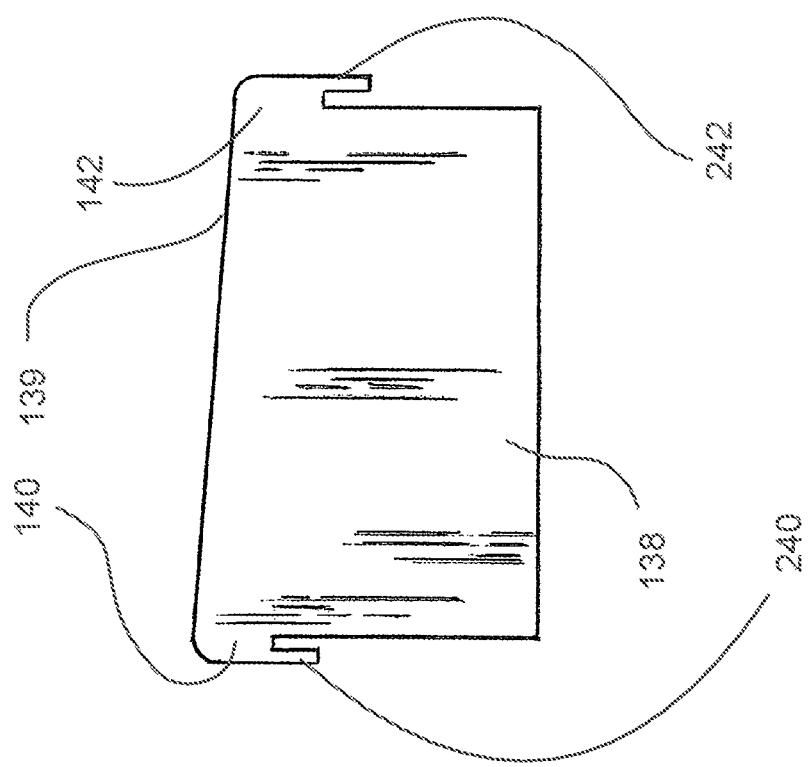
FIG. 27 is a top plan view of a guide plate showing an off-axis orientation of the guiding tabs with rear protrusions from the guiding tabs.

Similarly, FIGS. 24, 27, and 28 show the guiding plate 138 and associated guiding tabs 140/142, with the addition of rear protrusions 240/242. As mentioned, these rear protrusions 240/242 wrap around and help guide the vertical legs 110/112, as may be seen in FIG. 5.

Figure 30:
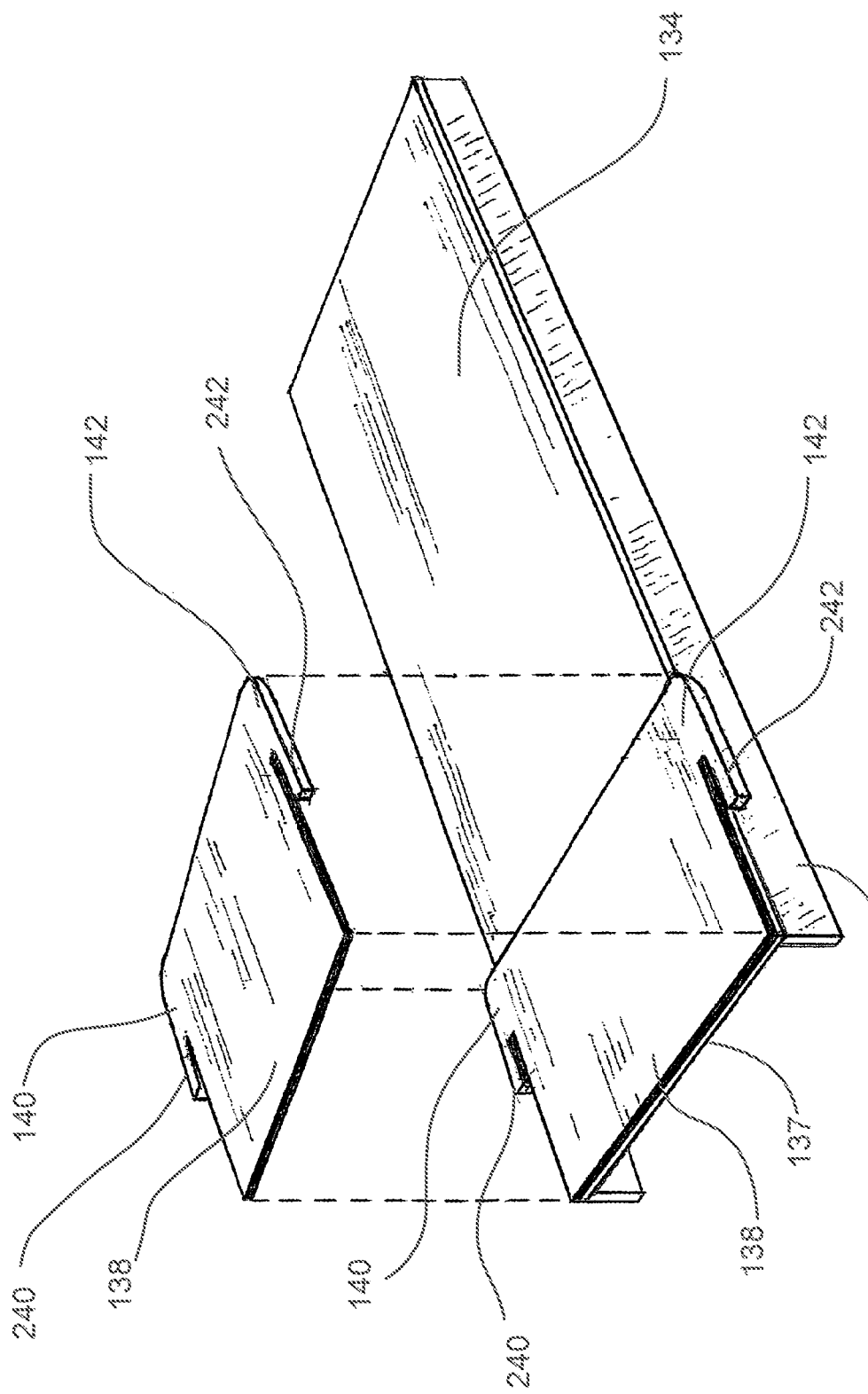
FIG. 30 is a partially exploded view of the trim tab, in combination with a guide plate with rear protrusions from the guiding tabs, wherein the figure conceptually shows where said guide plate is coupled.

FIG. 29 is a partially exploded view of the trim tab 134, in combination with a guide plate 138, wherein FIG. 29 conceptually shows where said guide plate 138 is coupled on a trim tab 134. The Figure also shows the guiding tabs 140/142, and sidewall 136. FIG. 30 shows a similar arrangement, and discloses an embodiment in which the rear protrusions 240/242 are present.

FIGS. 31-33 show the underside of the system, wherein the fluid hinges 150a/150b may be appreciated. Also shown is the engagement of the safety catch tabs 118/120 securing below the trim tab 134 of the system. FIG. 33 shows a port fluid hinge 150a with bracket 250a and protrusion 251a. FIG. 32 shows a starboard fluid hinge 150b with bracket 250b and protrusion 251b.

FIGS. 34-36, like FIGS. 31-33, shows the underside of a system of an alternate embodiment that uses rounded safety catch tabs 218/220. FIG. 36 shows a port fluid hinge 150a with bracket 250a and protrusion 251a. FIG. 35 shows a starboard fluid hinge 150b with bracket 250b and protrusion 251b. Also shown in FIG. 34 are the aft extensions 240/242 of the guiding tabs 140/142.

Figure 37:
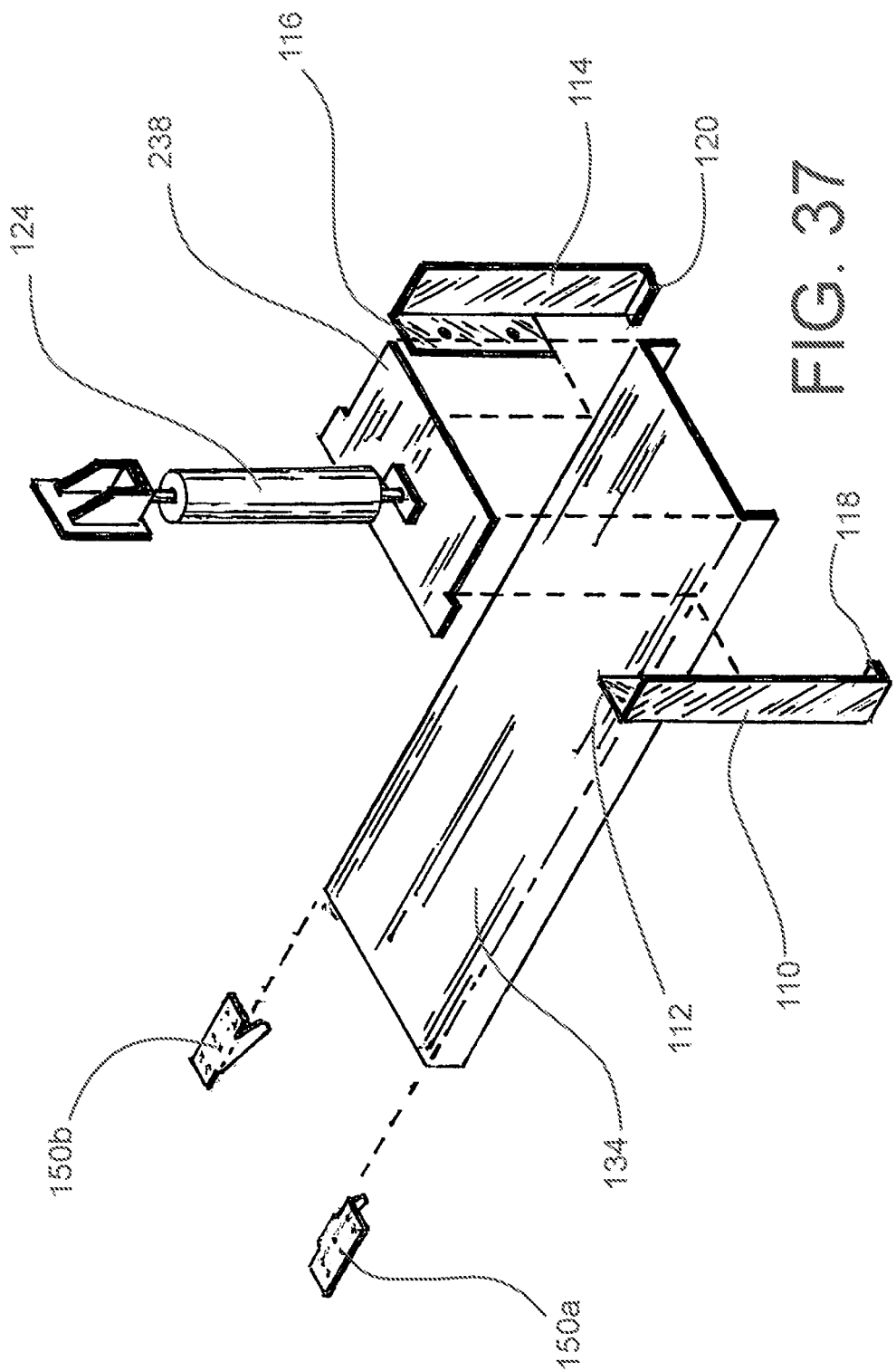
FIG. 37 is an exploded rear perspective view of the trim tab system with a guiding plate.
Figure 38:
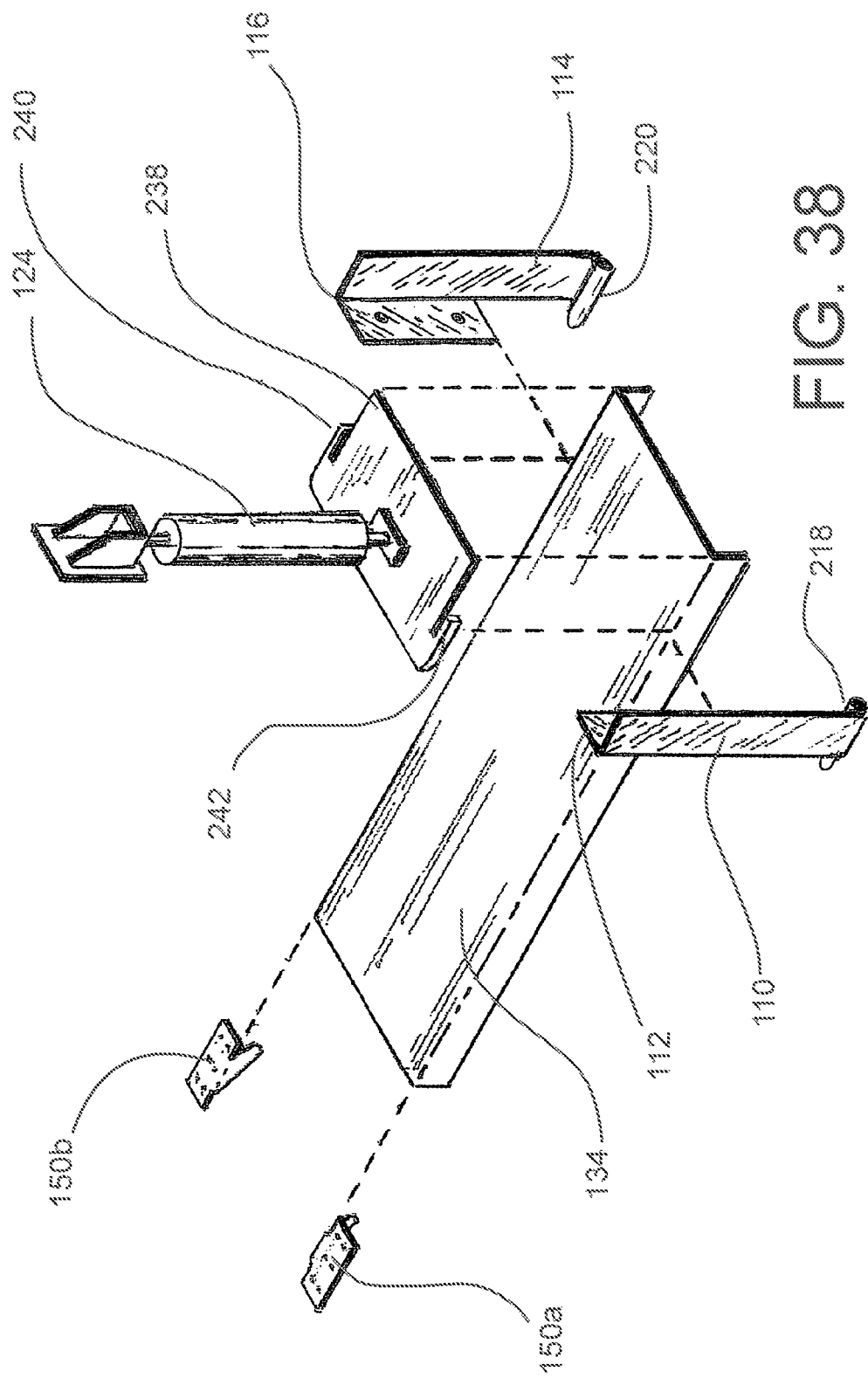
FIG. 38 is an exploded rear perspective view of the trim tab system with a guiding plate having rear protrusions.

FIG. 37 is an exploded rear perspective view of the trim tab 134 system with a guiding plate 238. FIG. 38 is an exploded rear perspective view of the trim tab 134 system with a guiding plate 238 having rear protrusions 240/242 and rounded safety catch tabs 218/220.

An embodiment of the invention provides for a system for a transom-mount trim tab system with a fluid hinge. The system 1000 includes a trim tab 134 having a planar surface with a forward section 131 located under a hull 127 of the watercraft and a rear portion 137 extending aft of a transom 126. This arrangement can be particularly appreciated in FIGS. 3, 7, and 8.

The system 1000 includes a forward mounting means 150a/150b, shown in FIGS. 10, and 31-38, located at the forward section of the trim tab 134 including a pair of fluid hinge brackets 150a/150b, each with a mounting plate 250a/250b, and a containment protrusion 251a/251b. Fluid hinges allow the trim tabs to move and slide without a permanently fixed connection. It allows the trim tab to move under the forces easier, and make for an easy disconnection for maintenance and replacement since there is no fixed hinge connecting it.

For further securement from forces acting on the trim tab 134, a pair of guiding tabs 140/142 coupled to the trim tab 134. A first guiding tab 140 in the pair of guiding tabs 140/142 extends outward from a port side of the trim tab 134. A second guiding tab 142 in the pair of guiding tabs 140/142 extends outward from a starboard side of the trim tab 134. This can be primarily seen in most figures, including FIGS. 1-10, 23-31, 34, 37, and 38.

These guiding tabs 140/142 engage with a pair of aft mounting brackets 111/113. These aft mounting brackets 111/113 mount to the transom 126 of the watercraft and secure the rear 137 of the trim tab 134, while absorbing the forces so that the actuator 124 is not damaged. Most embodiments include at least one transom-mounted actuator 124. The brackets can be primarily seen in FIGS. 1-22, 31, 32, 37, and 38. The pair of aft mounting brackets 111/113 includes a port mounting bracket 111 and a starboard mounting bracket 113.

The port mounting bracket 111 and the starboard mounting bracket 113 are configurable for variable mounting, as may be seen in a comparison of FIGS. 7 and 8. Each mounting bracket 111/113 includes a vertical leg 110/112 having a vertical leg upper portion 172 and a vertical leg bottom portion 174. The vertical leg bottom portion 174 is configured in a vertical orientation, and the vertical leg upper portion 172 is configurable to be angulated relative to a transom 126 of a watercraft, as may be seen in FIGS. 7 and 8 in respect to a top view of the mounting brackets 111/113 for horizontal curvature, and FIGS. 19-22 for further vertical curvature, in which the angulation 144/146 is adjustable in X, Y, and Z directions. The vertical legs 110/112 of the mounting brackets 111/113 are in physical communication with the guiding tabs 140/142, but are not physically coupled.

As such, the upper portion 172 of the vertical leg 110 and the mounting bracket 176 having a configurable angle 144/146 there-between, wherein the angle 144/146 may be enlarged or reduced resulting in an adjustment relative to a curvature in the transom 126 of a watercraft.

The bottom portion of each vertical leg terminates in a safety catch tab 118/120/228/220/320. The safety catch tab 118/120/228/220/320 may take several forms, each essentially performing the same function of stopping the rear of the trim tab 134 from descending too far below the hull 127 of the watercraft. In some embodiments the safety catch tab 320 is located on an outward side of each of the vertical legs 110/112, in the pair of aft mounting brackets 111/113, as may be seen in FIG. 6. In some embodiments, the safety catch tab 118/120/218/220 is located on an inward side of each of the vertical legs 111/113 in the pair of aft mounting brackets 111/113, as seen in FIG. 5. In some embodiments, the safety catch tab 320 is removable. In these embodiments, the safety catch tab 320 may include a set of screws 201 to mount the safety catch tab 320 to the bottom portion of the vertical legs 110/112, as shown in FIG. 6. The safety catch tab 118/120 may be flat, as seen in FIG. 4, or the safety catch tab 218/220 may also be cylindrical, as seen in FIG. 5, with a rounded forward section for hydrodynamic efficiency, though other geometries may be incorporated based on the needs of the installation.

In some embodiments, each guiding tab 140/142 includes an outermost extension 240/242 protruding aft of the guiding tab 140/142 thereby creating a containment area 152 between the outermost extension 240/242 and the trim tab 134. This may be appreciated in FIGS. 2, 3, 5, 6, 10, 24, 27, 28, 30, 34, and 38. The guiding tabs 140/242 are configured to engage with the vertical legs 110/112 by surrounding a forward side of the leg 110/112, a starboard side of leg 110/112, and a port side of the leg 110/112 of the mounting bracket 111/113. The guiding tabs 140/142 are located forward of the vertical legs 110/112 and extend along an outer surface of the vertical legs 110/112 of the mounting brackets 111/113, and the outermost extensions 240/242 surrounding an outer surface of the vertical legs 110/112, whereby each vertical leg 110/112 is secured on three sides of the vertical leg 110/112. This arrangement may been primarily seen in FIGS. 5 and 6.

In many embodiments, the pair of guiding tabs 140/142 are coupled to the trim tab 134 through use of a guiding plate 138/238. The pair of guiding tabs 140/142 are configured as a part of the guiding plate 138/238 and located towards a forward section of the guiding plate 139, and the guiding plate 138/238 is affixed to the trim tab 134, as may be seen in the figures, including FIGS. 1-10, and as appreciated in FIGS. 29 and 30. The guiding plate 138/238 is configured to affix to the rear portion 137 of the trim tab 134 thereby increasing the structural rigidity of the trim tab 134 making the trim tab 134 about eight times stronger. The trim tab 134 may further include a pair of sidewalls 136 for strength.

In many embodiments, a cross-section 168 of the vertical legs 110/112 include a rounded forward portion 170 of the vertical legs 110/112 for enhanced hydrodynamic efficiency.

While there has been shown and described above the preferred embodiment of the instant invention it is to be appreciated that the invention may be embodied otherwise than is herein specifically shown and described and that, within said embodiment, certain changes may be made in the form and arrangement of the parts without departing from the underlying ideas or principles of this invention as set forth in the Claims appended herewith.

I claim:

1. A system for a transom-mount trim tab system with a fluid hinge, comprising:
    a trim tab having a planar surface;
    said trim tab having a forward section located under a hull of a watercraft and an rear portion extending aft of a transom;
    a forward mounting means located at said forward section of said trim tab including a pair of fluid hinge brackets, each with a mounting plate, and a containment protrusion;
    a pair of guiding tabs coupled to said trim tab;
    a first guiding tab in said pair of guiding tabs extending outward from a port side of said trim tab;
    a second guiding tab in said pair of guiding tabs extending outward from a starboard side of said trim tab
    a pair of aft mounting brackets
    said pair of aft mounting brackets include a port mounting bracket and a starboard mounting bracket
    each of said port mounting bracket and said starboard mounting bracket are configurable for variable mounting, wherein each mounting bracket includes a vertical leg having a vertical leg upper portion and a vertical leg bottom portion, said vertical leg bottom portion is configured in a vertical orientation, and said vertical leg upper portion is configurable to be angulated relative to a transom of a watercraft; and
    said upper portion of said vertical leg and said mounting bracket having a configurable angle there-between, wherein said angle may be enlarged or reduced resulting in an adjustment relative to a curvature in said transom of a watercraft.

2. The system as recited in claim 1, wherein each guiding tab includes an outermost extension protruding aft of said guiding tab thereby creating a containment area between said outermost extension and said trim tab.

3. The system as recited in claim 2, wherein said guiding tabs are configured to engage with said vertical legs by surrounding a forward side of said leg, a starboard side of said leg, and a port side of said leg, of said mounting bracket, wherein said guiding tabs are located forward of said vertical legs and extend along an outer surface of said vertical legs of said mounting brackets, and said outermost extensions surrounding an outer surface of said vertical legs, whereby each vertical leg is secured on three sides of said vertical leg.

4. The system as recited in claim 1, wherein said pair of guiding tabs are coupled to said trim tab through use of a guiding plate, wherein said pair of guiding tabs are configured as a part of said guiding plate and located towards a forward section of said guiding plate, and said guiding plate is affixed to said trim tab.

5. The system as recited in claim 1, wherein said guiding plate is configured to affix to said rear portion of said trim tab thereby increasing said structural rigidity of said trim tab by a factor of eight.

6. The system as recited in claim 1, wherein said vertical legs of said mounting brackets are in physical communication with said guiding tabs, but are not physically coupled.

7. The system as recited in claim 1, further comprising:
a cross-section of said vertical legs included a rounded forward portion of said vertical legs for enhanced hydrodynamic efficiency.

8. The system as recited in claim 1, further comprising:
a bottom portion of each vertical leg in each of said pair of aft mounting brackets terminating in a safety catch tab.

9. The system as recited in claim 8, wherein said safety catch tab is removable.

10. The system as recited in claim 9, wherein said safety catch tab includes a set of screws to mount said safety catch tab to said vertical leg bottom portion of said vertical legs.

11. The system as recited in claim 8, wherein said safety catch tab is cylindrical with a rounded forward section for hydrodynamic efficiency.

12. The system as recited in claim 8, wherein said safety catch tab is located on an outward side of each of said vertical legs in said pair of aft mounting brackets.

13. The system as recited in claim 8, wherein said safety catch tab is located on an inward side of each of said vertical legs in said pair of aft mounting brackets.

14. The system as recited in claim 1, wherein said trim tab further includes a pair of sidewalls.

15. The system as recited in claim 1, further comprising:
at least one transom-mounted actuator.

* * * * *